(12) United States Patent
Iwase

(10) Patent No.: US 11,254,319 B2
(45) Date of Patent: Feb. 22, 2022

(54) DRIVER STATE ESTIMATION DEVICE, METHOD AND COMPUTER PROGRAM THEREFOR

(71) Applicant: Mazda Motor Corporation, Hiroshima (JP)

(72) Inventor: Koji Iwase, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 0 days.

(21) Appl. No.: 17/160,403

(22) Filed: Jan. 28, 2021

(65) Prior Publication Data

US 2021/0253111 A1 Aug. 19, 2021

(30) Foreign Application Priority Data

Feb. 19, 2020 (JP) .............................. JP2020-026632

(51) Int. Cl.
*B60W 40/08* (2012.01)
*G06K 9/00* (2006.01)

(52) U.S. Cl.
CPC ......... *B60W 40/08* (2013.01); *G06K 9/00845* (2013.01); *B60W 2540/225* (2020.02); *B60W 2540/229* (2020.02)

(58) Field of Classification Search
CPC ........... B60W 40/08; B60W 2540/225; B60W 2540/229; G06K 9/00845
See application file for complete search history.

(56) References Cited

U.S. PATENT DOCUMENTS

| 2017/0001648 | A1* | 1/2017 | An | G08B 21/06 |
| 2018/0354523 | A1* | 12/2018 | Kishi | G06K 9/00791 |
| 2019/0236386 | A1* | 8/2019 | Yu | G08G 1/165 |
| 2020/0130578 | A1* | 4/2020 | Murakami | G06K 9/0061 |
| 2020/0254876 | A1* | 8/2020 | Cordell | G06K 9/00845 |

FOREIGN PATENT DOCUMENTS

JP 3027786 B2 4/2000

* cited by examiner

*Primary Examiner* — Mohamed Barakat
(74) *Attorney, Agent, or Firm* — Xsensus LLP

(57) ABSTRACT

A device, method and computer program product provide driver state estimation. A first index value correlated with an amount of an attention source allocated to top-down attention of a driver and a second index value correlated with an amount of the attention source allocated to bottom-up attention of the driver are determined. The driver state including an attention function degraded state of the driver is estimated based on the first index value and the second index value. A vehicle being operated by the driver may be controlled in accordance with the estimated driver state.

15 Claims, 16 Drawing Sheets

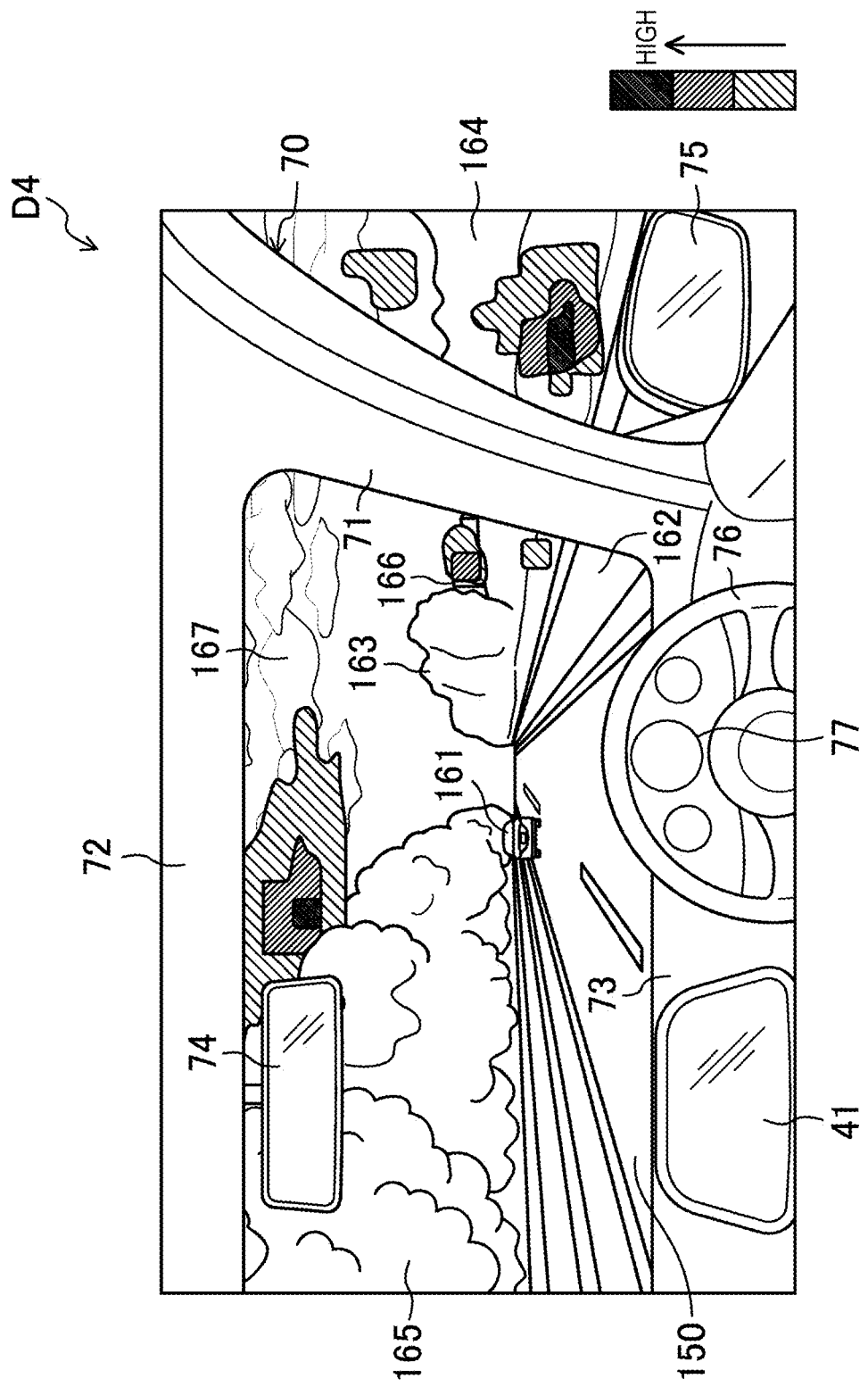

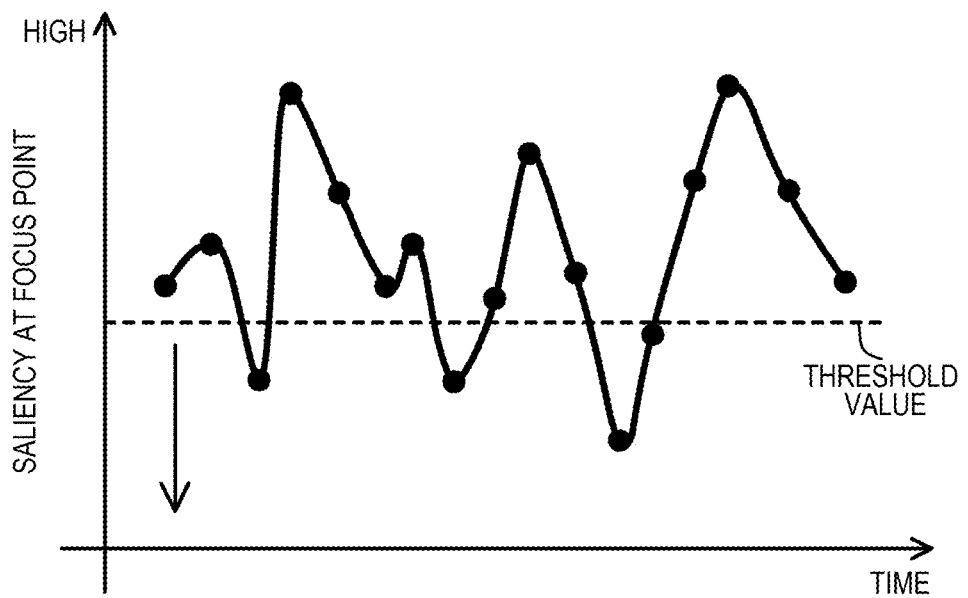

DRIVER STATE ESTIMATION DEVICE, METHOD AND COMPUTER PROGRAM THEREFOR

CROSS REFERENCE TO RELATED APPLICATIONS

The present application contains subject matter related to Japanese Priority Application 2020-026632, filed in the Japanese Patent Office on Feb. 19, 2020, the entire contents of which being incorporated herein by reference in its entirety. The application also contains subject matter related to that described in U.S. application Ser. No. xx/xxx,xxx, and claiming priority to JP 2020-026633, filed Feb. 19, 2020, the entire contents of which being incorporated herein by reference in its entirety.

TECHNICAL FIELD

A technique disclosed herein relates to a driver state estimation device.

BACKGROUND ART

A driver state determination device that determines a driver state is disclosed in Patent document 1. This driver state determination device includes: sightline detection means for detecting a driver's sightline direction; sightline frequency distribution calculation means for calculating, as sightline frequency distribution, frequency distribution of the sightline direction within a predetermined period from a detection result by this sightline detection means; and driver state determination means for determining the driver's psychological or physiological state by identifying a pattern of the sightline frequency distribution.

PRIOR ART DOCUMENTS

Patent Documents

[Patent document 1] Japanese patent No. 3,027,786

SUMMARY

Problems to be Solved

In the driver state determination device disclosed in Patent document 1, when it is considered that the driver's sightline concentrates on one point, the driver is determined to be in an "absent-minded state". Here, in the case where a distance to a preceding vehicle is not a safe inter-vehicular distance, it is considered that the driver sightline focuses on the preceding vehicle, and thus the driver is not determined to be in the "absent-minded state".

Meanwhile, with the method for estimating the driver state on the basis of a degree of concentration of the driver's sightline on the one point and the distance to the preceding vehicle like the device disclosed in Patent document 1, as recognized by the inventor, it is impossible to estimate an attention function degraded state of the driver, which is caused by a disease or the like of the driver, because the variable/parameters do not account for it. For this reason, it is difficult to improve estimation accuracy of the driver state with respect to the attention of the driver.

A technique disclosed herein has been made in view of the above point and therefore has a purpose of improving estimation accuracy of a driver state.

Means for Solving the Problems

A technique disclosed herein relates to a driver state estimation device, method therefor, and computer program that estimates a state of a driver who is in a movable body.

The driver state estimation device includes: first circuitry configured to determine a first index value correlated with an amount of an attention source allocated to top-down attention of the driver; second circuitry configured to determine a second index value correlated with an amount of the attention source allocated to bottom-up attention of the driver; and estimation circuitry configured to estimate the driver state including an attention function degraded state of the driver based on the first index value and the second index value.

The driver state estimation method includes: determining a first index value correlated with an amount of an attention source allocated to top-down attention of the driver; determining a second index value correlated with an amount of the attention source allocated to bottom-up attention of the driver; and estimating the driver state including an attention function degraded state of the driver based on the first index value and the second index value.

A non-transitory computer readable storage device having computer readable instructions that when executed by a controller including a computer cause the computer to execute a driver state estimation method, the driver state estimation method including: determining a first index value correlated with an amount of an attention source allocated to top-down attention of the driver; determining a second index value correlated with an amount of the attention source allocated to bottom-up attention of the driver; and estimating the driver state including an attention function degraded state of the driver based on the first index value and the second index value.

In the above configuration, it is possible to estimate the driver state including the attention function degraded state of the driver based on the amount of the attention source allocated to the top-down attention of the driver (hereinafter described as a "top-down attention source amount") and the amount of the attention source allocated to the bottom-up attention of the driver (hereinafter described as a "bottom-up attention source amount"). In addition, compared to a case where the driver state is estimated on the basis of only one of the top-down attention source amount and the bottom-up attention source amount, it is possible to improve estimation accuracy of the driver state.

The driver state estimation device may further include a sightline detector that detects the driver's sightline. The first circuitry may be configured to: detect s a point of interest in the driver's surrounding environment; and derive the first index value on the basis of motion of the driver's sightline with respect to the point of interest in the driver's surrounding environment. The second circuitry may be configured to: detect distribution of saliency in the driver's surrounding environment; and derive the second index value on the basis of the motion of the driver's sightline with respect to the distribution of the saliency in the driver's surrounding environment.

In the above configuration, it is possible to appropriately derive the first index value based on movement of the driver's sightline with respect to the point of interest in the driver's surrounding environment. In addition, it is possible to appropriately derive the second index value based on movement of the driver's sightline with respect to the distribution of the saliency in the driver's surrounding environment.

In the driver state estimation device, the estimation circuitry may be configured to estimate that the driver is in the attention function degraded state in the case where the first index value falls below a predetermined first threshold value and the second index value falls below a predetermined second threshold value, and to estimate that the driver is not in the attention function degraded state in the case where the first index value falls below a predetermined first threshold value and the second index value does not fall below the second threshold value.

In the above configuration, in the case where the first index value, which is correlated with the top-down attention source amount of the driver, falls below the first threshold value, the second index value, which is correlated with the bottom-up attention source amount of the driver, is compared with the second threshold value. In this way, it is possible to estimate whether the driver is in the attention function degraded state.

In the driver state estimation device, the first threshold value may be set to a value that corresponds to the amount of the attention source requested to the top-down attention of the driver. In addition, the second threshold value may be set to a value that corresponds to the amount of the attention source requested to the bottom-up attention of the driver.

In the above configuration, it is possible to appropriately set the first threshold value, which is used for evaluation of the top-down attention source amount of the driver, and the second threshold value, which is used for evaluation of the bottom-up attention source amount of the driver.

In the driver state estimation device, the first circuitry may be configured to derive the first index value based on a matching degree between the point of interest in the driver's surrounding environment and the driver's sightline. The second circuitry may be configured to derive the second index value based on of a matching degree between the high saliency point in the driver's surrounding environment and the driver's sightline. The first circuitry and the second circuitry may be configured not to use the driver's sightline that matches neither the point of interest in the driver's surrounding environment nor the high saliency point among the driver's sightline detected by the sightline detection section when deriving the first index value and the second index value.

In the above configuration, it is possible to eliminate the driver's sightline, which matches neither the point of interest in the driver's surrounding environment nor the high saliency point, (that is, the driver's sightline as noise) from the driver's sightline, which is detected by the sightline detection section, when the first index value and the second index value are derived. In this way, it is possible to improve the estimation accuracy of the driver state.

In the driver state estimation device, the driver's surrounding environment may include: a first area where the top-down attention of the driver is predominant; and a second area where the bottom-up attention of the driver is predominant. The first circuitry may be configured to determine the first index value in the first area. The second circuitry may be configured to determine the second index value in the second area. The estimation circuitry may estimate the driver state based on the first index value in the first area and the second index value in the second area.

In the above configuration, it is possible to estimate the driver state including the attention function degraded state of the driver based on the top-down attention source amount in the first area and the bottom-up attention source amount in the second area. In addition, compared to the case where the driver state is estimated on the basis of only one of the top-down attention source amount and the bottom-up attention source amount, it is possible to improve the estimation accuracy of the driver state.

BRIEF DESCRIPTION OF THE DRAWINGS

FIG. 7 is a view illustrating a saliency map indicative of distribution of saliency.

FIG. 8 is a graph illustrating a change in saliency at a focus point.

FIG. 9 is a graph illustrating a change in the saliency at a random point.

DETAILED DESCRIPTION

Figure 1:
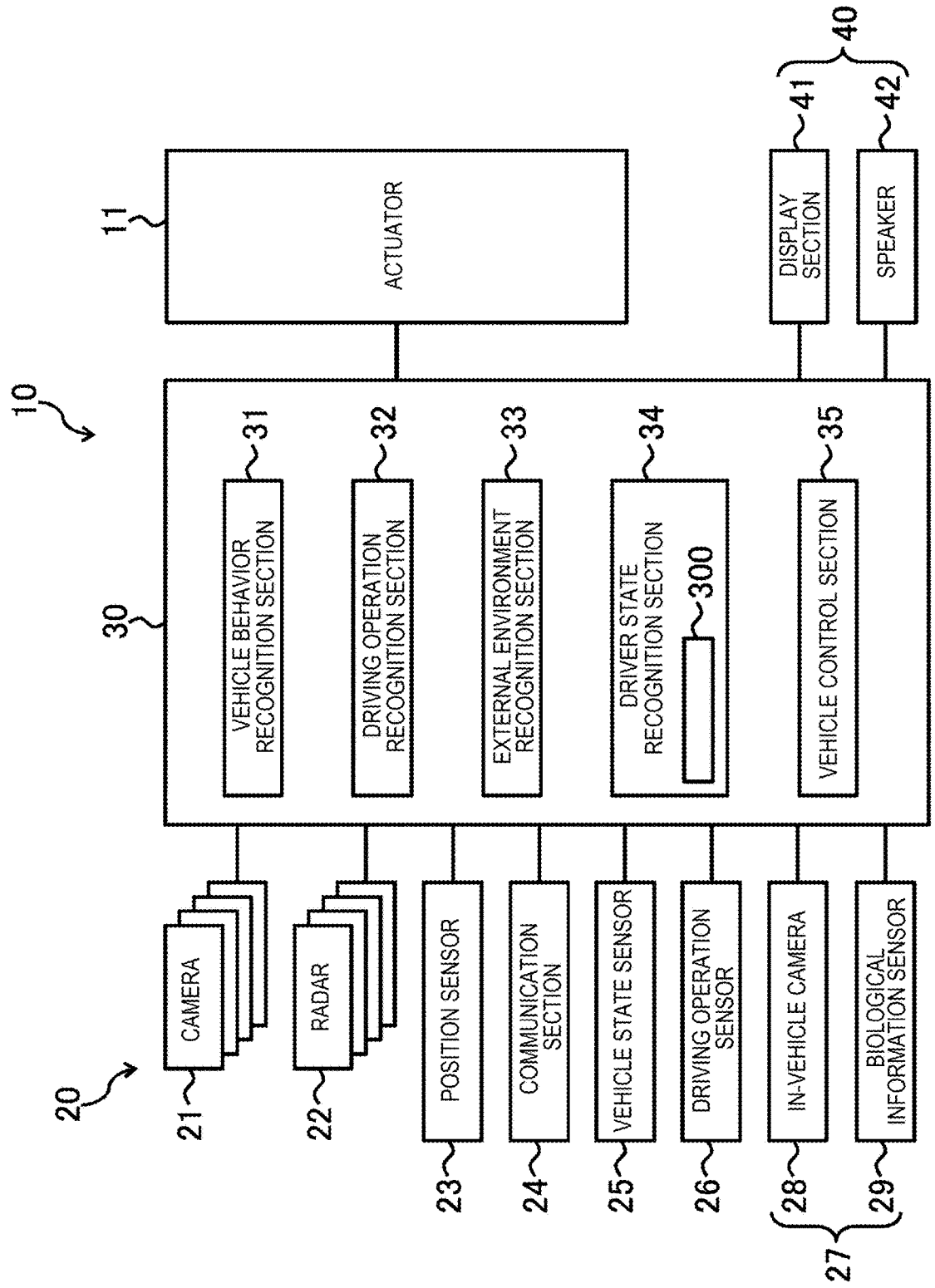
FIG. 1 is a block diagram illustrating a configuration of a vehicle control system according to an embodiment.

A detailed description will hereinafter be made on an embodiment with reference to the drawings. The same or corresponding portions in the drawings will be denoted by the same reference signs and numerals and the description thereon will not be repeated.

(Vehicle Control System)

FIG. 1 illustrates a configuration of a vehicle control system 10 according to the embodiment. This vehicle control system 10 is provided in a vehicle (e.g., a four-wheeled motor vehicle). The vehicle can be switched among manual driving, assisted driving, and automated driving. The manual driving is driving in which the vehicle travels according to a driver's operation (for example, an operation of an accelerator pedal or the like). The assisted driving is driving in which the vehicle travels while the driver's operation is assisted. The automated driving is driving in which the vehicle travels without the driver's operation. The vehicle control system 10 controls the vehicle in the assisted driving and the automated driving. More specifically, the vehicle control system 10 controls operation (particularly, travel) of the vehicle by controlling an actuator 11 in the vehicle. The vehicle control system 10 is an example of a movable body control system provided to a movable body.

In this example, the vehicle control system 10 includes an information acquisition section 20, a vehicle controller 30, and a notification section 40. In the following description, the vehicle that is provided with the vehicle control system 10 will be described as a "host vehicle", and another vehicle that exists around the host vehicle will be described as the "other vehicle".

[Actuator]

The actuators 11 include an actuator for a drive system, an actuator for a steering system, an actuator for a brake system, and the like. Examples of the actuator for the drive system are an engine, a transmission, and a motor. An example of the actuator for the brake system is a brake. An example of the actuator for the steering system is a steering wheel.

[Information Acquisition Section]

The information acquisition section 20 acquires various types of information that are used for control of the vehicle. In this example, the information acquisition section 20 includes plural cameras 21, plural radars 22, a position sensor 23, a communication section 24, a vehicle state sensor 25, a driving operation sensor 26, and a driver state sensor 27.

<Camera>

The plural cameras 21 each have a similar configuration. The plural cameras 21 are provided on the vehicle such that imaging areas of the plural cameras 21 surround the vehicle. The plural cameras 21 capture images of environment around the vehicle (external environment) and thereby acquire image data on the external environment. The image data that is acquired by each of the plural cameras 21 is transmitted to the vehicle controller 30. Each camera 21 may have an image sensor that takes fixed and/or moving images in the visual spectrum and/or non-visual ranges such as infrared and ultraviolet.

In this example, the camera 21 is a monocular camera having a wide-angle lens. For example, the camera 21 is configured by using solid-state imaging elements such as a charge-coupled device (CCD) and a complementary metal-oxide-semiconductor (CMOS). The camera 21 may be a monocular camera having a narrow-angle lens or a stereo camera having a wide-angle lens or a narrow-angle lens.

<Radar>

The plural radars 22 each have a similar configuration. The plural radars 22 are provided to the vehicle such that search areas of the plural radars 22 surround the vehicle. The plural radars 22 detect the external environment. More specifically, each of the radars 22 emits a search wave toward the external environment of the vehicle, receives a reflected wave from the external environment, and thereby detects the external environment. Detection results by the plural radars 22 are transmitted to the vehicle controller 30.

For example, the radar 22 may be a millimeter-wave radar that emits a millimeter wave, a short-range radar, SRR, operating, for example, in the 20 GHz to 27 GHz range, a long range radar, LRR, operating, for example, in the 76 to 81 GHz range, a lidar (light detection and ranging) that emits a laser beam, e.g., a laser beam having wavelengths in at least one of ultraviolet, visible, and near infrared spectrums, an infrared sensor that radiates infrared light, or an ultrasonic sensor that emits an ultrasonic wave.

<Position Sensor>

The position sensor 23 detects a position (for example, a latitude and a longitude) of the vehicle. For example, the position sensor 23 receives GPS information from the Global Positioning System and detects the position of the vehicle based on the GPS information. The information (the position of the vehicle) that is acquired by the position sensor 23 is transmitted to the vehicle controller 30.

<Communication Section>

The communication section 24 receives information through an external network (for example, the Internet or the like) that is provided outside the vehicle. For example, the communication section 24 receives communication information from the other vehicle located around the vehicle, car navigation data from a navigation system, traffic information, and high-precision map information such as a dynamic map. The information that is acquired by the communication section 24 is transmitted to the vehicle controller 30.

<Vehicle State Sensor>

The vehicle state sensor 25 detects a state (for example, a speed, acceleration, a yaw rate, and the like) of the vehicle. For example, the vehicle state sensor 25 includes: a vehicle speed sensor that detects the speed of the vehicle; an acceleration sensor that detects the acceleration of the vehicle; a yaw rate sensor that detects the yaw rate of the vehicle; and the like. The information (the vehicle state) that is acquired by the vehicle state sensor 25 is transmitted to the vehicle controller 30.

<Driving Operation Sensor>

The driving operation sensor 26 detects a driving operation on the vehicle. For example, the driving operation sensor 26 includes an accelerator pedal position sensor, a steering angle sensor, a brake hydraulic pressure sensor, and the like. The accelerator pedal position sensor detects an operation amount of the accelerator pedal of the vehicle. The steering angle sensor detects a steering angle of the steering wheel of the vehicle. The brake hydraulic pressure sensor detects an operation amount of the brake of the vehicle. The information (the vehicle driving operation) that is acquired by the driving operation sensor 26 is transmitted to the vehicle controller 30.

<Driver State Sensor>

The driver state sensor 27 detects a state of the driver who is in the vehicle (for example, body behavior, biological information, and the like of the driver). The information (the driver state) that is acquired by the driver state sensor 27 is transmitted to the vehicle controller 30. In this example, the driver state sensor 27 includes an in-vehicle camera 28, a biological information sensor 29, and the like.

<<In-Vehicle Camera>>

The in-vehicle camera 28 is provided in the vehicle. The in-vehicle camera 28 captures an image of an area including the driver and thereby acquires image data including the driver. The image data that is acquired by the in-vehicle camera 28 is transmitted to the vehicle controller 30. In this example, the in-vehicle camera 28 is arranged in front of the driver, and an imaging area thereof is set such that the driver's face (particularly, eyeballs) is positioned within the imaging area. The in-vehicle camera 28 may be provided on goggles worn by the driver.

<<Biological Information Sensor>>

The biological information sensor 29 is provided in the vehicle. The biological information sensor 29 detects the driver's biological information. Examples of the driver's biological information are sweating, heartbeats, a blood flow rate, a skin temperature, and the like. The information (the driver's biological information) that is acquired by the biological information sensor 29 is transmitted to the vehicle controller 30. For example, the biological information sensor 29 may be arranged to a position (for example, a steering wheel 76, which will be described below) that comes in contact with the driver's hand or may be provided to a member that is attached to the driver's body.

[Vehicle Controller]

The vehicle controller 30 is connected to the actuator and each section (in this example, the information acquisition section 20, the notification section 40, and the like) of the vehicle control system 10 in a manner capable of sending a signal thereto. The vehicle controller 30 controls the actuator 11 and each of the sections of the vehicle control system 10 based on the information that is acquired from each of the sections of the vehicle control system 10. More specifically, in the assisted driving or the automated driving, the vehicle controller 30 determines a target route as a route on which the vehicle should travel based on the various types of the information acquired from the information acquisition section 20. Then, the vehicle controller 30 determines target motion as motion of the vehicle that is required for travel on the target route. Thereafter, the vehicle controller 30 controls operation of the actuator 11 such that the motion of the vehicle becomes the target motion. The vehicle controller 30 is an example of the driver state estimation device.

For example, the vehicle controller 30 is constructed of one or plural electronic control units (ECUs). The ECU may include a single integrated circuit (IC) or may include plural ICs. In the IC, a single core or die may be provided, or plural cooperative cores or dies may be provided. For example, the core or the die may include a processor (a CPU) and memory that stores a program for operating the CPU and information such as a processing result of the CPU.

In this example, the vehicle controller 30 has a vehicle behavior recognition section 31, a driving operation recognition section 32, an external environment recognition section 33, a driver state recognition section 34, and a vehicle control section 35. Optionally, the vehicle controller 30 may include a processor 835 and other circuitry in system 800 of FIG. 18, which may be implemented as a single processor-based system, or a distributed processor-based system, including remote processing, such as cloud-based processing.

<Vehicle Behavior Recognition Section>

The vehicle behavior recognition section 31 estimates behavior (for example, the speed, the acceleration, the yaw rate, and the like) of the vehicle based on the output of the vehicle state sensor 25. For example, the vehicle behavior recognition section 31 uses a learning model that is generated by deep learning to generate data on the vehicle behavior from the output of the vehicle state sensor 25.

<Driving Operation Recognition Section>

The driving operation recognition section 32 recognizes the driving operation on the vehicle based on the output of the driving operation sensor 26. For example, the driving operation recognition section 32 uses a learning model that is generated by deep learning to generate data on the driving operation on the vehicle from the output of the driving operation sensor 26.

<External Environment Recognition Section>

The external environment recognition section 33 recognizes the external environment of the vehicle based on output of the plural cameras 21, output of the plural radars 22, output of the position sensor 23, output of the communication section 24, and output of the vehicle behavior recognition section 31.

For example, the external environment recognition section 33 uses a learning model that is generated by deep learning to generate data on the external environment of the vehicle from the above output. In the deep learning, a deep neural network is used. An example of the deep neural network is a convolutional neural network (CNN).

More specifically, the external environment recognition section 33 performs image processing on the image data that is acquired by the plural cameras 21, and thereby generates road map data (for example, three-dimensional map data) on a road on which the vehicle can move. In addition, the external environment recognition section 33 acquires object information that is information on an object existing around the vehicle based on detection results by the plural radars 22. The object information includes positional coordinates of the object, a speed of the object, and the like. The external environment recognition section 33 may acquire the object information based on the image data that is acquired by the plural cameras 21. Then, the external environment recognition section 33 integrates the road map data and the object information to generate integrated map data (the three-dimensional map data) on the external environment.

The road map data includes information on a road shape, a road structure, a road gradient, a lane marking, a road surface marking, and the like. The object information includes stationary object information and mobile object information. The stationary object information is information on a stationary object that is not displaced over time. The stationary object information includes information on a shape of the stationary object, positional coordinates of the stationary object, and the like. Examples of the stationary object are a road sign and a structure. Examples of the structure are a traffic light, a median strip, a center pole, a building, a signboard, a level crossing, a tunnel, a railway track bed, and a bus stop. The mobile object information is information on a mobile object that is possibly displaced over time. The mobile object information includes information on a shape of the mobile object, positional coordinates of the mobile object, a speed of the mobile object, and the like. Examples of the mobile object are the other vehicle and a pedestrian.

The high-precision map information that is received by the communication section 24 may include the road map data and the object information. In this case, the external environment recognition section 33 may be configured to generate the integrated map data based on the road map data and the object information included in the high-precision map information and to appropriately correct the integrated map data based on the output of the information acquisition section 20 including the plural cameras 21 and the plural radars 22. For example, in the case where the integrated map data does not include the object that is recognized based on the output of the plural cameras 21 and the output of the plural radars 22, the external environment recognition section 33 may add the object information on the object to the integrated map data. Meanwhile, in the case where the object that is included in the integrated map data is not recognized based on the output of the plural cameras 21 and the output of the plural radars 22, the external environment recognition section 33 may delete the object information on the object from the integrated map data.

<Driver State Recognition Section>

The driver state recognition section 34 recognizes the driver state (for example, a health condition, a feeling, a posture, and the like of the driver) based on output of the driver state sensor 27. For example, the driver state recognition section 34 uses a learning model that is generated by deep learning to generate data on the driver state from the output of the driver state sensor 27. In this example, the driver state recognition section 34 has a driver state estimation section 300. A detailed description on the driver state estimation section 300 will be made below.

<Vehicle Control Section>

The vehicle control section 35 controls the actuator 11 based on output of the vehicle behavior recognition section 31, output of the driving operation recognition section 32, output of the external environment recognition section 33, and output of the driver state recognition section 34. In this example, the vehicle control section 35 executes travel control and notification control.

<<Travel Control>>

The travel control is executed in the assisted driving and the automated driving. In the travel control, the vehicle control section 35 controls the travel of the vehicle. In this example, in the travel control, the vehicle control section 35 performs candidate route generation processing, target route determination processing, and motion control processing.

In the candidate route generation processing, the vehicle control section 35 generates one or plural candidate routes based on the output of the external environment recognition section 33. The candidate route is a route on which the vehicle can travel and is a candidate for the target route. In this example, a safe route is included in the candidate routes that are generated by the candidate route generation processing. The safe route is a travel route toward a safe area (for example, a road shoulder).

For example, in the candidate route generation processing, the vehicle control section 35 generates travel map data (two-dimensional map data) that includes a road ahead in an advancing direction of the vehicle and the object existing on the road based on the output (the integrated map data) of the external environment recognition section 33. Then, the vehicle control section 35 generates the candidate route by using a state lattice method. More specifically, the vehicle control section 35 sets a grid area including a large number of grid points on the road in the travel map data, sequentially connects the plural grid points in the advancing direction of the vehicle, and thereby sets the plural travel routes. In addition, the vehicle control section 35 adds route cost for each of the plural travel routes. For example, as the vehicle safety on a certain travel route is increased, the route cost that is added to such a travel route is reduced. Then, based on the route cost that is added to each of the plural travel routes, the vehicle control section 35 selects, as the candidate route, one or plural travel routes from the plural travel routes.

In the target route determination processing, based on the output of the driving operation recognition section 32 and the output of the driver state recognition section 34, the vehicle control section 35 selects the candidate route that serves as the target route from the one or plural candidate routes generated in the candidate route generation processing. For example, of the plural candidate routes, the vehicle control section 35 selects the candidate route that the driver feels most comfortable.

In the motion control processing, the vehicle control section 35 determines the target motion based on the candidate route, which has been selected as the target route in the target route determination processing and controls the actuator 11 based on the determined target motion. For example, the vehicle control section 35 derives target drive power, a target braking force, and a target steering amount that are drive power, a braking force, and a steering amount required to produce the target motion, respectively. Then, the vehicle control section 35 sends a drive command value indicative of the target drive power, a brake command value indicative of the target braking force, and a steering command value indicative of the target steering amount to the actuator for the drive system, the actuator for the brake system, and the actuator for the steering system, respectively.

<<Notification Control>>

In the notification control, the vehicle control section 35 outputs various types of information of which the driver is to be notified. In this example, the vehicle control section 35 outputs the various types of the information, of which the driver is to be notified, to the notification section 40.

[Notification Section]

The notification section 40 is provided in the vehicle. The notification section 40 notifies the driver of the vehicle of the various types of the information. In this example, the notification section 40 includes a display section 41 and a speaker 42. The display section 41 outputs the various types of the information as an image. The speaker 42 outputs the various types of the information as voice.

[Vehicle Front-Side Configuration (Vehicle Components)]

Figure 2:
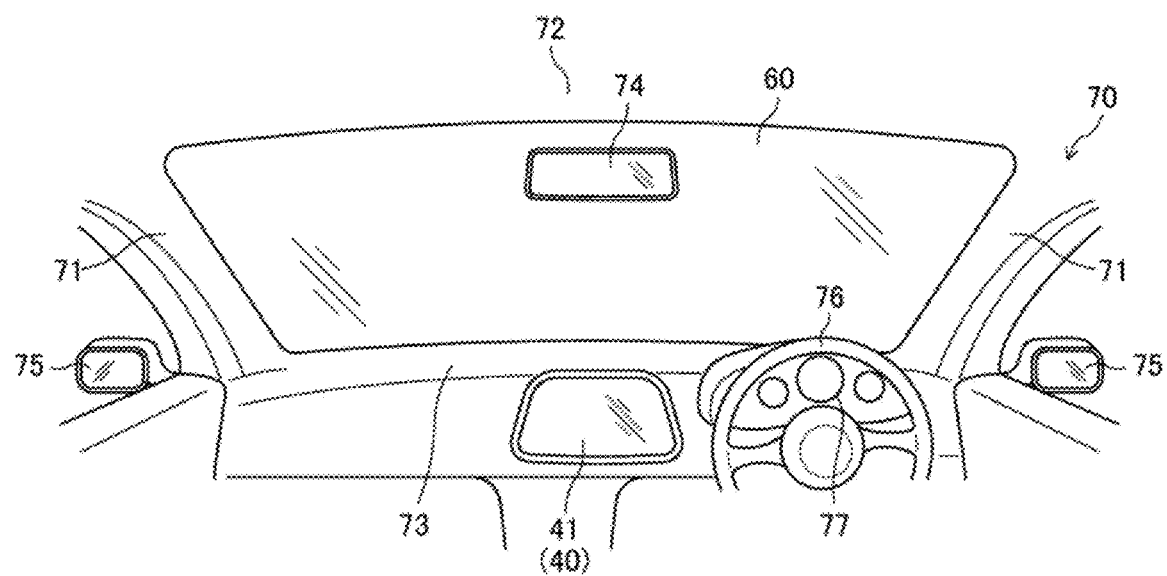
FIG. 2 is a view illustrating a vehicle front-side configuration.

As illustrated in FIG. 2, a front windshield 60 is provided on a front side of the vehicle. The front windshield 60 is surrounded by two front pillar trims 71, a roof trim 72, and an instrument panel 73. The two front pillar trims 71 define right and left boundaries of the front windshield 60. The two front pillar trims 71 are tilted such that upper portions thereof are farther separated from each other. The roof trim 72 and the instrument panel 73 define upper and lower boundaries of the front windshield 60, respectively. A rear-view mirror 74 is provided in an upper central portion of the front windshield 60. A side mirror 75 is provided on an outer side of each of the front pillar trims 71 in a vehicle width direction. The instrument panel 73 includes the display section 41, the steering wheel 76, and a meter cluster 77.

In this example, the two front pillar trims 71, the roof trim 72, the instrument panel 73, the rear-view mirror 74, the side mirrors 75, and the steering wheel 76 are vehicle components 70. The vehicle component 70 is part of the vehicle that blocks the driver's sightline when the driver looks at the outside of the vehicle.

[Description of Terms]

Next, a description will be made on terms that are used in a description below. In the following description, terms such as an attention source, top-down attention, a top-down attention source amount, a top-down attention demand amount, bottom-up attention, a bottom-up attention source amount, a bottom-up attention demand amount, a task demand, a point of interest, and saliency are used.

<Attention Source>

The attention source is a concept that represents attentiveness of a person (the driver) in a quantitative manner. The attentiveness of the person can be considered as a limited source. In the case where an amount of the attention source that is allocated to attention to a certain target is insufficient, the attentiveness of the person cannot fully be exerted with respect to such a target, and the attention of the person to such a target becomes insufficient.

<Top-Down Attention>

The top-down attention is an attention mechanism in which the person actively moves his/her sightline to an intended point. In particular, top-down attention is actively driven based on prior knowledge, plans, goals, and so forth, i.e., longer term cognitive strategies. For example, in the case where the person has previous knowledge on a stimulus be selected, the person can actively bias points to select the stimulus as a purpose.

<Top-Down Attention Source Amount and Top-Down Attention Demand Amount>

The top-down attention source amount is an amount of the attention source that is allocated to the top-down attention of the person. The top-down attention demand amount is an amount of the attention source that is requested for the top-down attention of the person. In the case where the top-down attention source amount is smaller than the top-down attention demand amount, the top-down attention becomes insufficient.

<Bottom-Up Attention>

The bottom-up attention is an attention mechanism in which the person's sightline is passively attracted to noticeable point. In particular, bottom-up attention is passively driven by external factors to stimuli that are salient because of their inherent properties relative to the background. For example, in the case where, of plural visual stimuli, the single stimulus significantly differs from the stimuli therearound, in the case where the visual stimulus suddenly appears, or the like, the person's sightline is passively attracted to such a stimulus.

<Bottom-Up Attention Source Amount and Bottom-Up Attention Demand Amount>

The bottom-up attention source amount is an amount of the attention source that is allocated to the bottom-up attention of the person. The bottom-up attention demand amount is an amount of the attention source that is requested for the bottom-up attention of the person. In the case where the bottom-up attention source amount is smaller than the bottom-up attention demand amount, the bottom-up attention becomes insufficient.

<Task Demand>

The task demand is a difficulty of a driving task. As the difficulty of the driving task is increased, the task demand is increased. The driving task is work that is imposed on the driver who drives the vehicle. The driving task includes an external task related to the outside of the vehicle and an internal task related to the inside of the vehicle. Examples of the external task are monitoring of a situation, avoidance of danger, speed maintenance/adjustment, lane keeping/adjustment, compliance with traffic rules, and a destination search. Regarding monitoring of the situation, environment ahead of the vehicle is visually checked by the driver, and environment behind the vehicle is checked by using the rear-view mirror 74 and the side mirrors 75. Regarding the avoidance of the danger, an obstacle such as the other vehicle, the pedestrian, or a road-side object is checked, and the driving operation for the avoidance of the danger is performed. Regarding the speed maintenance/adjustment, the other vehicle that travels ahead of the host vehicle, the gradient of the road, road alignments, and the like are checked, and the driving operation for the speed maintenance/adjustment is performed. Regarding the lane keeping/adjustment, the road alignments, the lane marking, the road shoulder, and the like are checked, and the driving operation for the lane keeping/adjustment is performed. Regarding the compliance with the traffic rules, the traffic light, the road sign, the road surface marking, and the like are checked. Regarding the destination search, a signboard indicative of a destination, and the like are checked. Examples of the internal task are checking of display equipment such as the meter cluster 77 and checking of operation equipment such as the navigation system. For example, in a monotonous driving scene, such as on a controlled-access highway, in which the number of points to be checked is small, the task demand is reduced. Meanwhile, in a complicated driving scene, such as on a public road in an urban area, in which the number of points to be checked is large, the task demand is increased.

<Point of Interest>

The point of interest is a point to which the driver should pay attention in environment around the driver who is in the vehicle (hereinafter described as "driver's surrounding environment"). In the top-down attention, the point of interest is a point at which the driver should intentionally look. The point of interest can be defined per driving scene of the vehicle. Examples of the point of interest are the rear-view mirror 74, the side mirror 75, the meter cluster 77, the other vehicle, the pedestrian, the road-side object, the lane marking, the road shoulder, the traffic light, the road sign, and the road surface marking. The point of interest may be defined empirically. For example, an intersection into which the pedestrian is predicted to run may be set as the point of interest.

<Saliency>

The saliency is a value indicative of a degree of the visual stimulus that attracts the bottom-up attention varies by characteristics such as a color, luminance, a direction, motion, and so forth. For example, as a difference in the characteristic such as the color, the luminance, the direction, or the motion between any area included in the image and a surrounding area of the area becomes prominent, the visual stimulus that attracts the bottom-up attention is intensified, and the saliency in such any area is increased. As the saliency at any point included in the image is increased, the person's sightline is more likely to be attracted to such any point.

[Configuration of Driver State Estimation Section]

Figure 3:
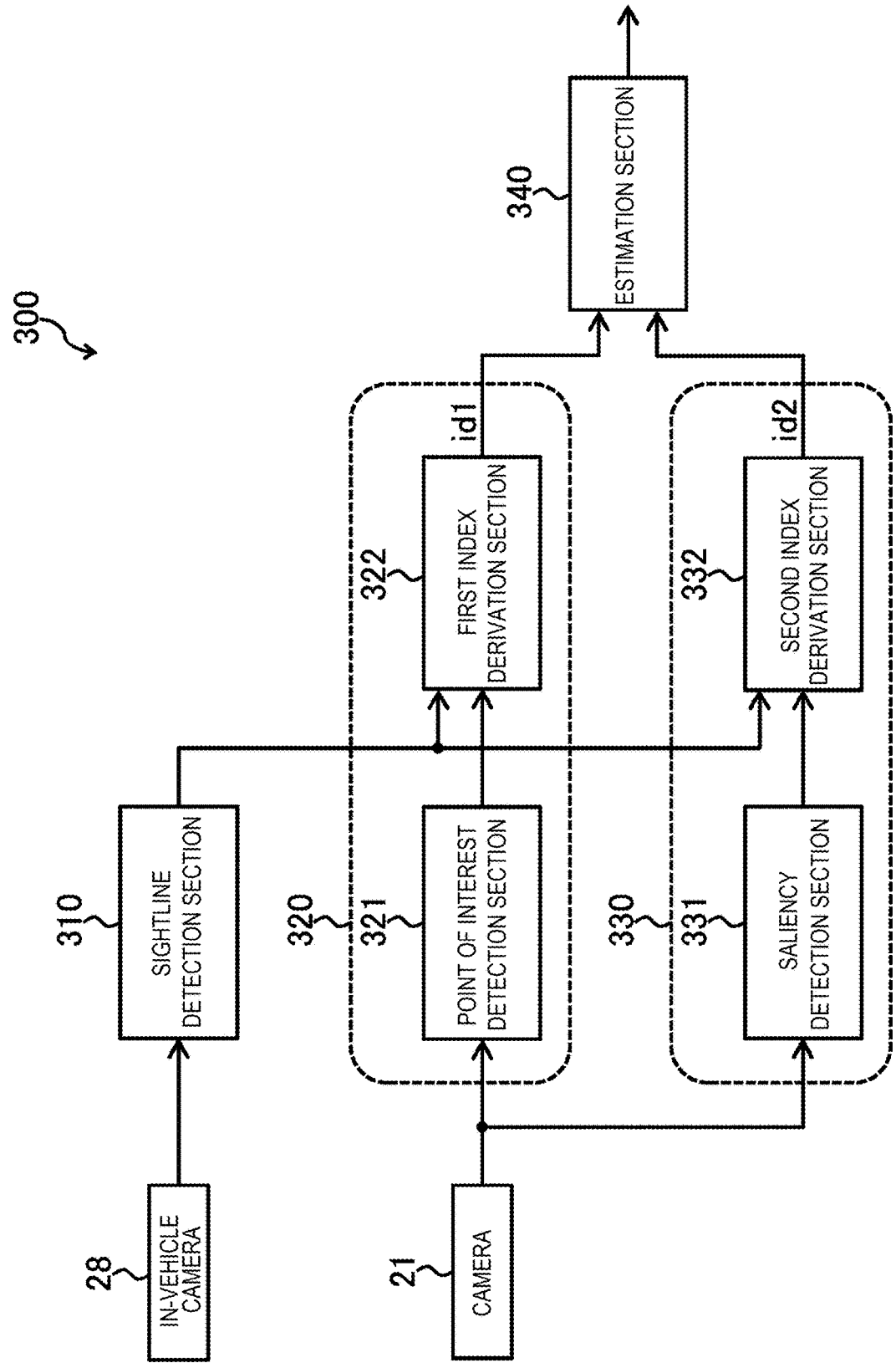
FIG. 3 is a block diagram illustrating a configuration of a driver state estimation section.

FIG. 3 illustrates a configuration of the driver state estimation section 300. The driver state estimation section 300 has a sightline detection section 310, a first measurement section 320, a second measurement section 330, and an estimation section 340.

<Sightline Detection Section>

The sightline detection section 310 detects the driver's sightline. In this example, the sightline detection section 310 performs sightline detection processing on the image data that is acquired by the in-vehicle camera 28, and thereby detects the driver's sightline. This sightline detection processing may be processing that is performed by using a learning model generated by deep learning (a learning model for detecting the sightline) or may be processing that is performed by using a well-known sightline detection technique. For example, the sightline detection section 310 detects the driver's pupils from the image (the image data) acquired by the in-vehicle camera 28 and detects the driver's sightline based on the detected pupils. The driver's sightline may be a sightline of the driver's right eye, may be a sightline of the driver's left eye, or may be a sightline based on the sightline of the driver's right eye and the sightline of the driver's left eye.

<First Measurement Section>

The first measurement section 320 measures a first index value id1 that is correlated with the top-down attention source amount of the driver. As the top-down attention source amount of the driver is increased, the first index value id1 is increased. In this example, the first measurement section 320 has a point of interest detection section 321 and a first index derivation section 322.

<<Point of Interest Detection Section>>

The point of interest detection section 321 detects the point of interest in the driver's surrounding environment. In this example, the point of interest detection section 321 generates point of interest map data D3 that indicates the point of interest in the driver's surrounding environment based on the output of the camera 21 that captures the image of an area ahead of the vehicle among the plural cameras 21. Alternatively, or complimentarily, point of interest information may be obtained from other external sources as well, e.g., from radio frequency (RF) communication messages received by a RF receiver sent from external devices such as other cars, which have other sensors, as well as beacons, which are local devices that transmit absolute position data of on the travel road in that particular location. More specifically, the point of interest detection section 321 generates the point of interest map data D3 by the following procedure.

Figure 4:
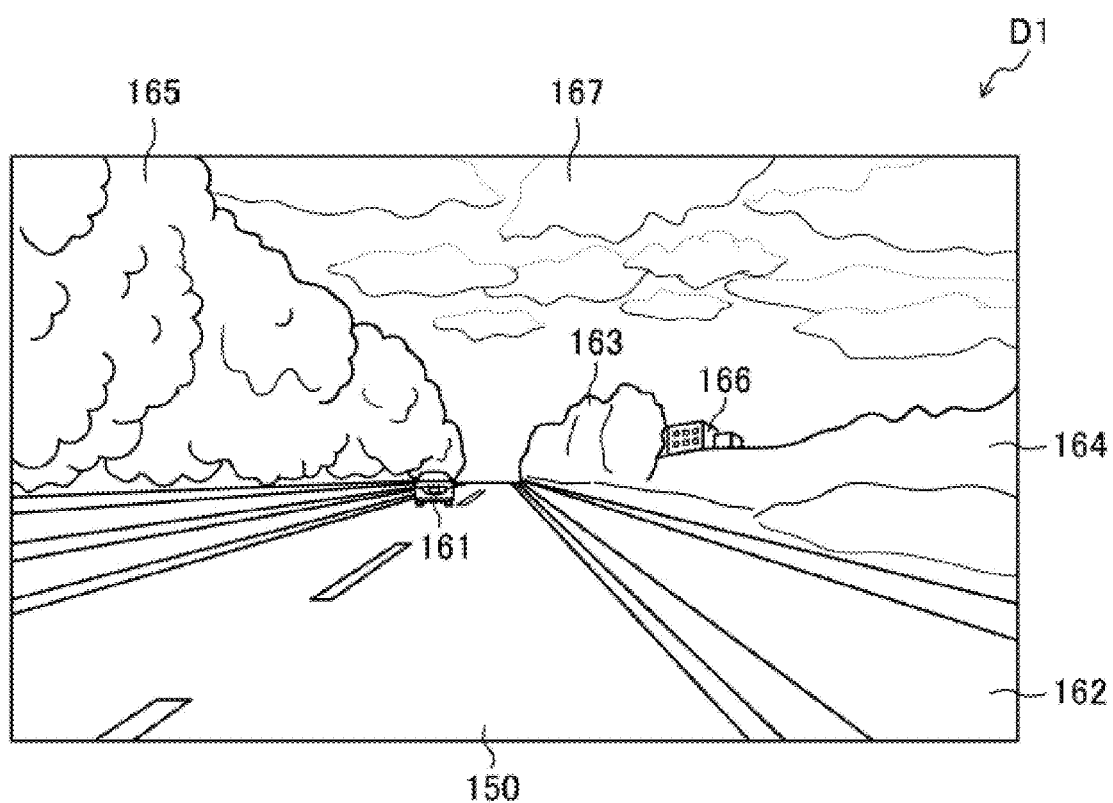
FIG. 4 is a view illustrating a front image that shows an area ahead of the vehicle.

First, the point of interest detection section 321 acquires front image data D1 based on the output of the camera 21 that captures the image of the area ahead of the vehicle among the plural cameras 21. As illustrated in FIG. 4, the front image data D1 is an image of the area ahead in the external environment of the vehicle. In an example illustrated in FIG. 4, the image of the front image data D1 includes a roadway 150. Another vehicle 161 travels on the roadway 150. A wall 162 is on a right side of the roadway 150. A tree 163 and a hill 164 are on a right side of the wall 162. A forest 165 is on a left side of the roadway 150. A building 166 is on a right side of the tree 163. Sky 167 expands on an upper side of the roadway 150, the tree 163, the hill 164, and the forest 165. In the example illustrated in FIG. 4, the sky 167 is cloudy sky and is almost white.

Figure 5:
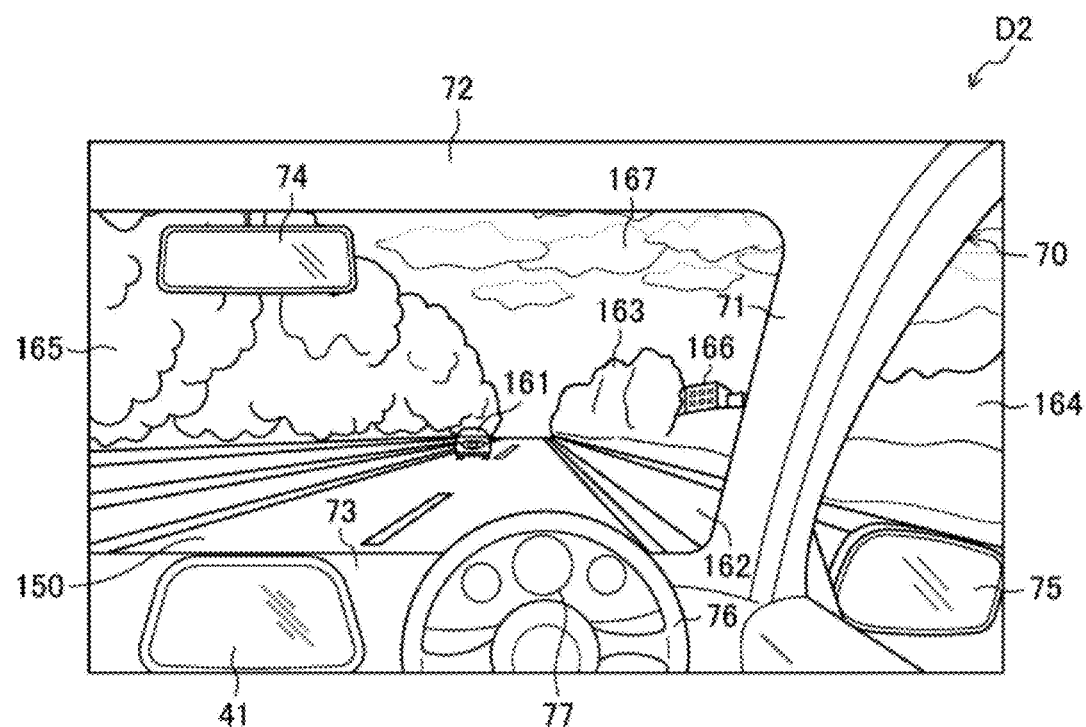
FIG. 5 is a view illustrating a composite image in which vehicle components are superposed on the front image.

Next, the point of interest detection section 321 generates a composite image data D2 by combining a component image data with the front image data D1. The component image data is an image of the vehicle components 70 (the vehicle components that block the driver's eyesight when the driver in the vehicle looks outside of the vehicle). For example, the component image data can be acquired when the camera captures an image of the front side of the vehicle from the driver's seat provided in the vehicle. As illustrated in FIG. 5, in the image of the composite image data D2, the image of the vehicle components 70 in the component image data is superposed on the image of the area ahead of the vehicle in the front image data D1. In this way, the composite image data D2 indicative of the driver's surrounding environment is generated.

Next, the point of interest detection section 321 detects the point of interest from the image of the driver's surrounding environment in the composite image data D2. For example, the point of interest is defined in advance per driving scene of the vehicle. The point of interest detection section 321 stores point of interest information indicative of the point of interest that is defined per driving scene of the vehicle. Then, the point of interest detection section 321 detects the driving scene of the vehicle based on the image of the composite image data D2 and detects the point of interest corresponding to the detected driving scene from the image of the composite image data D2. The detection of the driving scene may be processing that is performed by using a learning model generated by deep learning (a learning model for detecting the driving scene) or may be processing that is performed by using a well-known scene discrimination technique. Similarly, the detection of the point of interest may be processing that is performed by using a learning model generated by deep learning (a learning model for detecting the point of interest) or may be processing that is performed by using a well-known characteristic detection technique.

Figure 6:
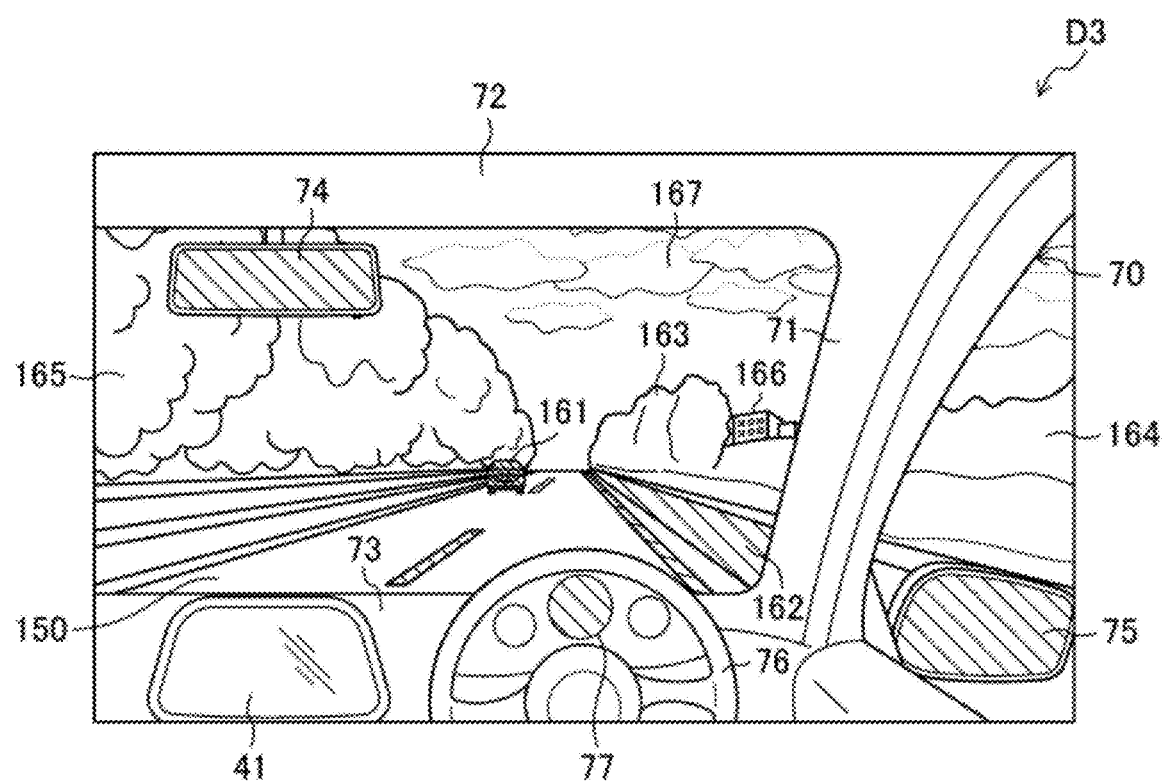
FIG. 6 is a view illustrating a point of interest map indicative of distribution of points of interest.

Next, the point of interest detection section 321 generates the point of interest map data D3 based on a detection result of the point of interest. As illustrated in FIG. 6, the point of interest map data D3 indicates distribution of the points of interest. In an example illustrated in FIG. 6, hatched points are the points of interest. More specifically, in the example illustrated in FIG. 6, the rear-view mirror 74, the side mirrors 75, the other vehicle 161, the wall 162, and the lane marking of the roadway 150 are the points of interest.

The point of interest detection section 321 generates the point of interest map data D3 by the above procedure every time the front image data D1 is updated. In this way, plural pieces of the point of interest map data D3 that are arranged in a chronological order can be acquired.

<<First Index Derivation Section>>

Referring again to FIG. 3, the first index derivation section 322 derives the first index value id1 based on movement of the driver's sightline with respect to the point of interest in the driver's surrounding environment. More specifically, the first index derivation section 322 derives the first index value id1 based on a matching degree (a matching frequency) between the point of interest in the driver's surrounding environment and the driver's sightline. When the top-down attention source amount of the driver is increased, the matching degree between the point of interest in the driver's surrounding environment and the driver's sightline is increased, and the first index value id1 is thereby increased.

In this example, the first index derivation section 322 derives, as the first index value id1, a value corresponding to the matching degree between the point of interest in the point of interest map data D3, which is generated by the point of interest detection section 321, and the driver's sightline, which is detected by the sightline detection section 310. More specifically, the first index derivation section 322 performs the following processing for each predetermined measurement period.

First, the first index derivation section 322 extracts two or more pieces of the point of interest map data D3 (FIG. 6) in the measurement period from plural pieces of the point of interest map data D3 that are arranged in the chronological order. Then, based on a direction of the driver's sightline detected by the sightline detection section 310, the first index derivation section 322 detects a focus point in each of two or more pieces of the point of interest map data D3 included in the measurement period. The focus point is a point indicative of a position (coordinates) of the driver's sightline in the point of interest map data D3. For example, the first index derivation section 322 may detect, as the focus point, the position of the driver's sightline from the point of interest map data D3 at predetermined sampling intervals. Alternatively, the first index derivation section 322 may detect, as the focus point, the position of the driver's sightline, a stagnation period of which is longer than a predetermined reference period.

Next, the first index derivation section 322 determines whether the focus point detected from the point of interest map data D3 in the measurement period matches the point of interest in the point of interest map data D3.

Next, the first index derivation section 322 derives the first index value id1 based on a result of the matching determination between the focus point and the point of interest. For example, the first index value id1 is a value that corresponds to a ratio of the number of the focus points matching the points of interest to the total number of the focus points included in the measurement period (hereinafter described as an "interest matching ratio"). This interest matching ratio is an example of the matching degree between the point of interest in the driver's surrounding environment and the driver's sightline. In this way, the first index value id1 is derived for each measurement period.

<Second Measurement Section>

The second measurement section 330 measures a second index value id2 correlated with the bottom-up attention source amount of the driver. As the bottom-up attention source amount of the driver is increased, the second index value id2 is increased. In this example, the second measurement section 330 has a saliency detection section 331 and a second index derivation section 332.

<<Saliency Detection Section>>

The saliency detection section 331 detects distribution of the saliency in the driver's surrounding environment. In this example, the saliency detection section 331 generates saliency map data D4 of FIG. 7 that indicates the distribution of the saliency in the driver's surrounding environment based on the output of the camera 21 that captures the image of the area ahead of the vehicle among the plural cameras 21. More specifically, the saliency detection section 331 generates the saliency map data D4 by the following procedure.

First, like the point of interest detection section 321, the saliency detection section 331 generates the front image data D1 and generates the composite image data D2 by combining the component image data with the front image data D1.

Next, the saliency detection section 331 performs saliency map generation processing on the composite image data D2 and thereby generates the saliency map data D4. A well-known technique such as saliency detection can be used for the saliency map generation processing. For example, the saliency detection section 331 generates saliency map data for each of the characteristics such as the color, the luminance, the direction, and the motion, and adds the saliency maps of those characteristics. In this way, the saliency detection section 331 generates the final saliency map data (the saliency map data to which all the characteristics are reflected).

As illustrated in FIG. 7, the saliency map data D4 indicates the distribution of the saliency in the driver's surrounding environment. Values of pixels in the saliency map data D4 each represent the saliency in an area of the respective pixel. In an example illustrated in FIG. 7, a degree of the saliency is indicated by density of hatching. As the saliency increases, density of hatching increases.

The saliency detection section 331 generates the saliency map data D4 by the above procedure every time the front image data D1 is updated. In this way, plural pieces of the saliency map data D4 that are arranged in the chronological order can be acquired.

<<Second Index Derivation Section>>

The second index derivation section 332 derives the second index value id2 based on motion of the driver's sightline with respect to the distribution of the saliency in the driver's surrounding environment. More specifically, the second index derivation section 332 derives the second index value id2 based on a matching degree (a matching frequency) between a high saliency point in the driver's surrounding environment and the driver's sightline. The high saliency point is a point where the saliency is relatively high in the driver's surrounding environment. For example, the high saliency point is a point where the saliency exceeds predetermined reference saliency. When the bottom-up attention source amount of the driver is increased, the matching degree between the high saliency point in the driver's surrounding environment and the driver's sightline is increased, and the second index value id2 is thereby increased.

In this example, the second index derivation section 332 derives, as the second index value id2, a value corresponding to the matching degree between the high saliency point in the saliency map data D4, which is generated by the saliency detection section 331, and the driver's sightline detected by the sightline detection section 310. More specifically, the second index derivation section 332 performs the following first processing, second processing, third processing, and fourth processing for each predetermined calculation period.

In the first processing, the second index derivation section 332 extracts two or more pieces of the saliency map data D4 included in the calculation period from plural pieces of the saliency map data D4 that are arranged in the chronological order. Then, based on the direction of the driver's sightline detected by the sightline detection section 310, the second index derivation section 332 detects the focus point in each of two or more pieces of the saliency map data D4 included in the measurement period and detects the saliency at the focus point. The focus point is a point indicative of the position (the coordinates) of the driver's sightline in the saliency map data D4. For example, the second index derivation section 332 may detect, as the focus point, the position of the driver's sightline from the saliency map data D4 at predetermined sampling intervals. Alternatively, the second index derivation section 332 may detect, as the focus point, the position of the driver's sightline, the stagnation period of which is longer than the predetermined reference period. In this first processing, the saliency at the focus point per specified time can be acquired. As illustrated in FIG. 8, the saliency at the focus point is changed over time.

In the second processing, the second index derivation section 332 extracts two or more pieces of the saliency map data D4 included in the calculation period from the plural pieces of the saliency map data D4 that are arranged in the chronological order. Then, the second index derivation section 332 designates a random point in each of two or more pieces of the saliency map data D4 included in the measurement period and detects the saliency at the random point. The random point is a point indicative of a position (coordinates), which is designated randomly, in the saliency map data D4. The random point may be designated in the saliency map data D4, in which the focus point is detected by the first processing, among the plural pieces of the saliency map data D4. That is, time at which the saliency at the random point is detected may match the time at which the saliency at the focus point is detected. In this second processing, the saliency at the random point per specified time can be acquired. As illustrated in FIG. 9, the saliency at the random point is changed over time.

Next, the third processing is performed. In the third processing, the second index derivation section 332 derives receiver operating characteristic (ROC) curve indicative of a relationship between a "probability that the saliency at the focus point exceeds a threshold value" and a "probability that the saliency at the random point exceeds the threshold value" on the basis of the saliency at the focus point per specified time in the calculation period, which is acquired by the first processing, and the saliency at the random point per specified time in the calculation period, which is acquired by the second processing.

More specifically, the second index derivation section 332 changes the threshold value related to the saliency stepwise from a maximum value to a minimum value. In addition, the first index derivation section 322 performs the following processing every time the threshold value is changed.

First, the second index derivation section 332 calculates the number of the saliency at the focus point that exceeds the threshold value among the saliency at the focus point per specified time in the calculation period. Then, the second index derivation section 332 divides the number of the saliency at the focus point that exceeds the threshold value by the total number of the saliency at the focus point in the calculation period. In this way, the second index derivation section 332 calculates the probability that the saliency at the focus point exceeds the threshold value. In addition, the second index derivation section 332 calculates the number of the saliency at the random point that exceeds the threshold value among the saliency at the random point per specified time in the calculation period. Then, the second index derivation section 332 divides the number of the saliency at the random point that exceeds the threshold value by the total number of the saliency at the random point in the calculation period. In this way, the second index derivation section 332 calculates the probability that the saliency at the random point exceeds the threshold value.

Figure 10:
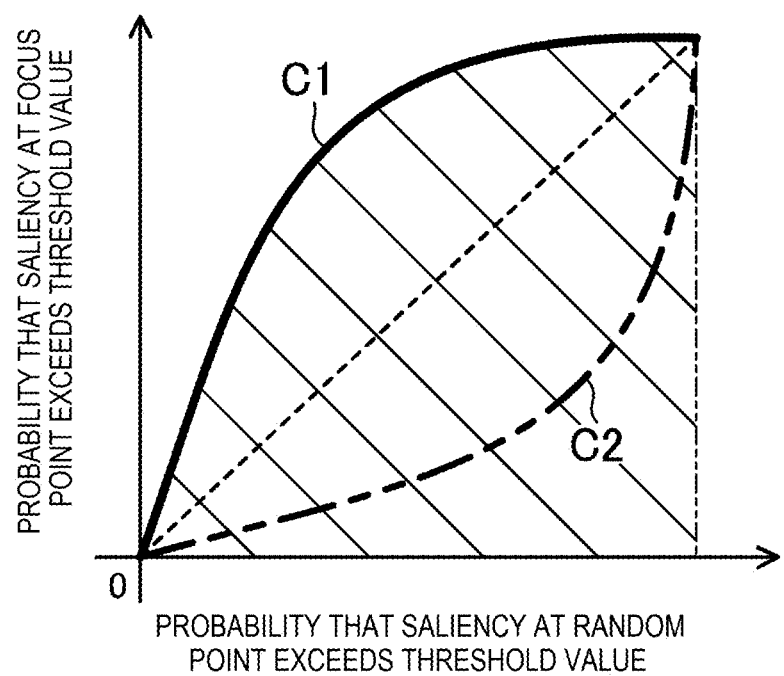
FIG. 10 is a graph illustrating a relationship between a probability that the saliency at the focus point exceeds a threshold value and a probability that the saliency at the random point exceeds the threshold value.

Then, the second index derivation section 332 derives the ROC curve based on combination of the "probability that the saliency at the focus point exceeds the threshold value" and the "probability that the saliency at the random point exceeds the threshold value" calculated per threshold value. FIG. 10 illustrates such an ROC curve. This ROC curve is changed according to intensification of a tendency that the driver's sightline is attracted to the high saliency point. For example, in the case where the driver's sightline tends to be pointed at the high saliency point, as indicated by a first curve C1 in FIG. 10, the ROC curve is an upwardly projected curve in comparison with a linear line (indicated by a broken or dashed line) with a gradient of one. On the other hand, in the case where the driver's sightline tends to be pointed at the low saliency point, as indicated by a second curve C2 in FIG. 10, the ROC curve is a downwardly projected curve in comparison with the linear line with the gradient of one. The low saliency point is a point where the saliency is relatively low in the driver's surrounding environment, i.e., falls below the predetermined reference saliency.

Next, the fourth processing is performed. In the fourth processing, the second index derivation section 332 calculates, as a saliency index value, an area under the curve (AUC) value that corresponds to an area under the ROC curve. For example, in the case where the first curve C1 in FIG. 10 is the ROC curve, the AUC value corresponds to an area of the hatched region in FIG. 10. For example, as the tendency of the driver's sightline to be pointed at the high saliency point is intensified, the AUC value as the saliency index value is increased. Meanwhile, as the tendency of the driver's sightline to be pointed at the low saliency point is intensified, the AUC value as the saliency index value is reduced. In this way, the saliency index value is derived for each calculation period.

Furthermore, the second index derivation section 332 performs fifth processing for each predetermined measurement period. The measurement period is longer than the calculation period. The plural calculation periods are included in each of the measurement periods. In the fifth processing, the second index derivation section 332 determines whether the saliency index value included in the measurement period exceeds a predetermined high saliency threshold value. Then, the second index derivation section 332 derives the second index value id2 based on a determination result of the saliency index value. For example, the second index value id2 is a value that corresponds to a ratio of the number of the saliency index values exceeding the high saliency threshold value to the total number of the saliency index values included in the measurement period (hereinafter described as a "high index ratio"). This high index ratio is an example of the matching degree between the high saliency point in the driver's surrounding environment and the driver's sightline. In this way, the second index value id2 is derived for each measurement period.

<Estimation Section>

Referring again to FIG. 3, the estimation section 340 estimates the driver state based on the first index value id1 and the second index value id2. More specifically, the estimation section 340 estimates the driver state based on the change in the first index value id1 and the change in the second index value id2. A detailed description on the estimation of the driver state will be made below.

[Driver State]

In this example, the driver state that is estimated by the estimation section 340 includes an "attention function degraded state", a "drifted state", and a "normal state".

The attention function degraded state is a state where an attention function is degraded, i.e., negatively affects driving of the vehicle. Causes of the degraded attention function are induction of a disease accompanied by the degraded attention function and wakefulness degradation. Examples of the disease accompanied by the degraded attention function include a cardiac disorder, e.g., myocardial infarction, a brain disorder, e.g., a cerebral stroke, epilepsy, and hypoglycemia, and the like. Upon the degraded state being estimated by the estimation section 340, the vehicle control section 35 can appropriately control the vehicle, examples of which are provided below.

The drifted state is a state where the driver does not focus on driving of the vehicle, e.g., is absent-minded, and negatively affects driving of the vehicle. Upon the drifted state being estimated by the estimation section 340, the vehicle control section 35 can appropriately control the vehicle, examples of which are provided below.

The normal state is a state that is neither the above-described attention function degraded state nor the above-described drifted state, and the driver can normally drive the vehicle. Upon the normal state being estimated by the estimation section 340, the vehicle control section 35 operates according to the normal state.

[Experiment Conducted by Inventor of the Present Application]

The inventor of the present application conducted an experiment as follows in order to examine a relationship between the driver state and behavior (particularly, the motion of the sightline) of the driver.

First, to observe the behavior of the driver in the attention function degraded state, a patient having attention dysfunction (hereinafter described as an "attention impairment patient") was selected as a subject. In addition, to observe the behavior of the driver in the normal state, a healthy person who did not suffer from the attention dysfunction (hereinafter simply described as a "healthy person") was selected as a subject.

Figure 11:
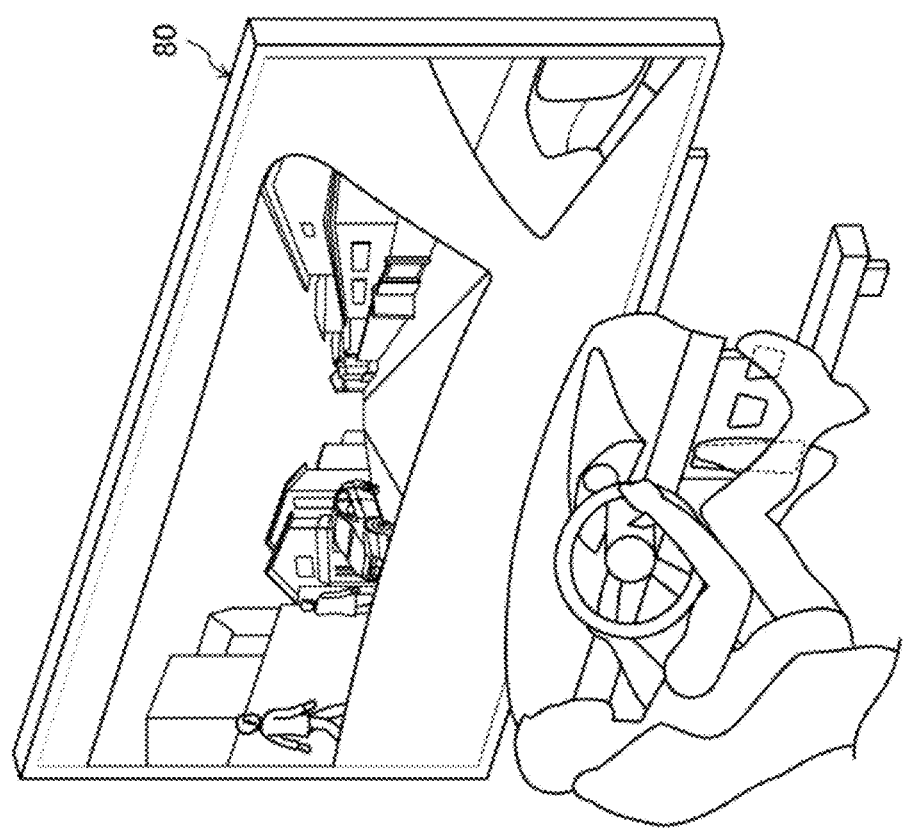
FIG. 11 is a perspective view illustrating a driving simulator.

Next, as illustrated in FIG. 11, the subjects selected as described above used a driving simulator 80 to simulate how they would respond under different conditions. More specifically, the subjects watched a video during the travel of the vehicle (a video that showed the external environment of the vehicle seen from the inside of the vehicle) by using the driving simulator 80, and behavior of the subjects during the experiment was observed. In this way, the behavior of the subjects while driving the vehicle was observed. In this experiment, a camera was installed in front of the subject who watched the video during the travel of the vehicle, and the camera was set such that the subject's eyeballs were included in an imaging area.

Then, the sightline detection processing was performed on image data that was acquired by the camera, and the subject's sightline was thereby detected. The subject's sightline was detected in a similar manner to the above-described processing performed by the sightline detection section 310.

In addition, the point of interest map data D3 indicative of the distribution of the points of interest was generated based on the video played by the driving simulator 80. Then, the first index value id1 correlated with the top-down attention source amount was derived based on the point of interest map data D3 and the subject's sightline. The point of interest map data D3 was generated in a similar manner to the above-described processing performed by the point of interest detection section 321. The first index value id1 was derived in a similar manner to the above-described processing performed by the first index derivation section 322.

The saliency map data D4 indicative of the distribution of the saliency was generated based on the video played by the driving simulator 80. Then, the second index value id2 correlated with the bottom-up attention source amount was derived based on the saliency map data D4 and the subject's sightline. The saliency map data D4 was generated in a similar manner to the above-described processing performed by the saliency detection section 331. The second index value id2 was derived in a similar manner to the above-described processing performed by the second index derivation section 332.

Next, the top-down attention source amount of the subject was estimated based on the first index value id1, and the bottom-up attention source amount of the subject was estimated based on the second index value id2.

The experiment described so far was conducted for the plural subjects.

Figure 12:
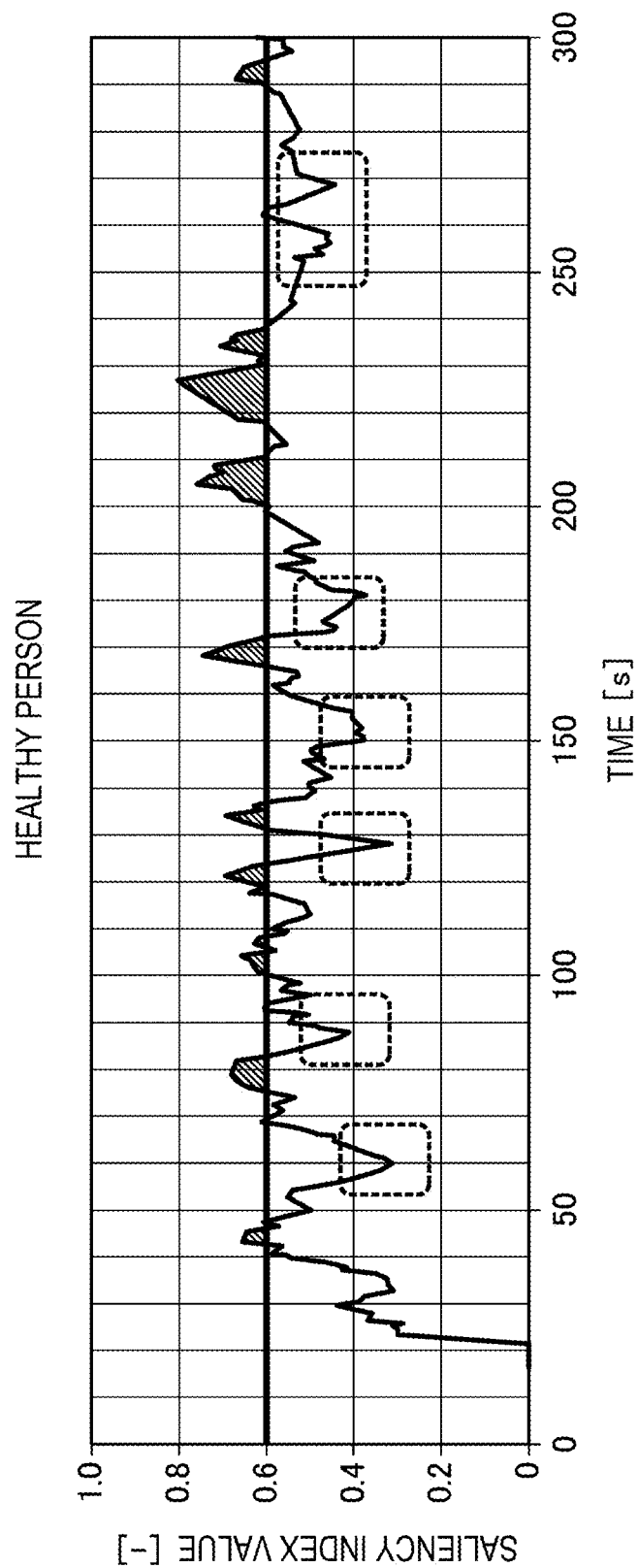
FIG. 12 is a graph illustrating a change in a saliency index value of a healthy person.
Figure 13:
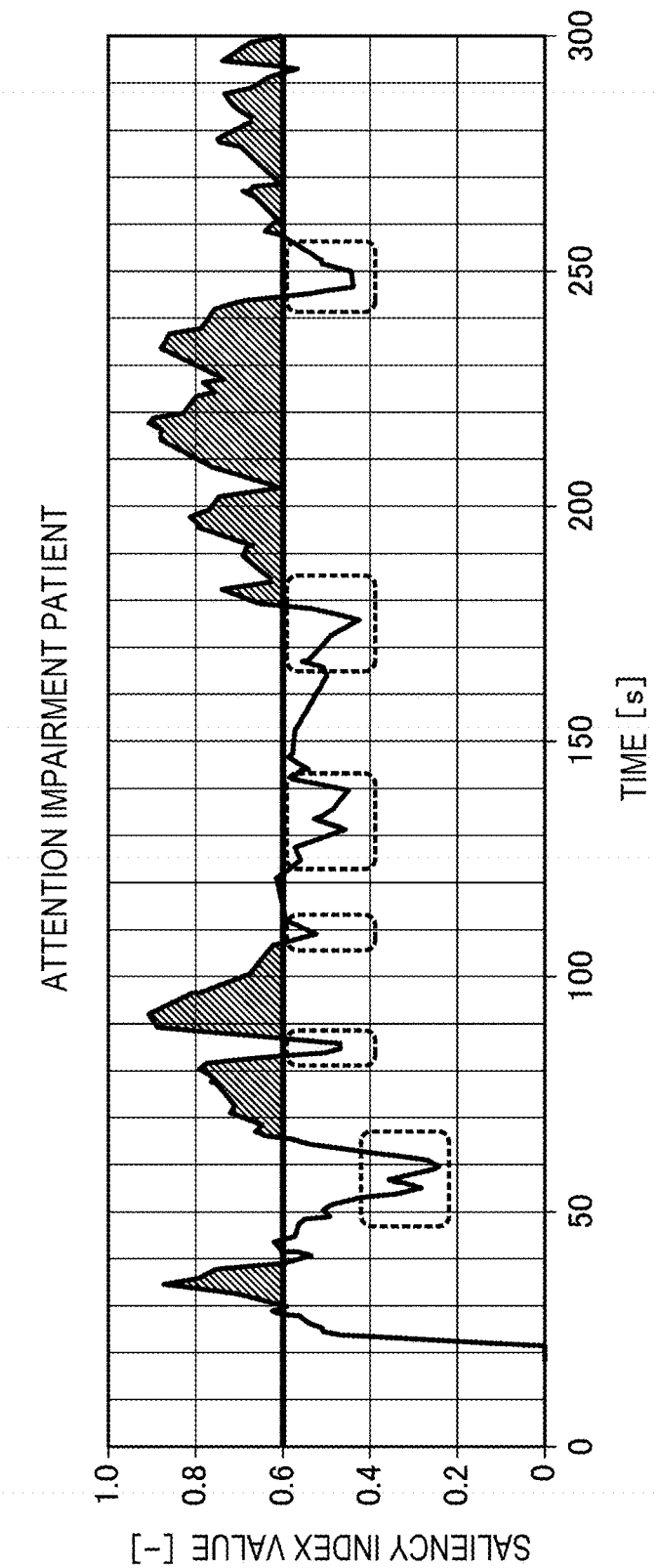
FIG. 13 is a graph illustrating a change in a saliency index value of an attention impairment patient.

FIG. 12 illustrates a temporal change in the saliency index value of the healthy person. FIG. 13 illustrates a temporal change in the saliency index value of the attention impairment patient. These saliency index values are acquired in the process of deriving the second index value id2. In each of FIG. 12 and FIG. 13, a hatched portion is a portion in which the saliency index value exceeds the high saliency threshold value (in this example, 0.6). A portion surrounded by a broken frame is a portion in which the point of interest matches the subject's sightline. The number of the portions in each of which the point of interest matched the sightline was larger for the healthy person than for the attention impairment patient, and the top-down attention was predominant for the healthy person. Meanwhile, the number of the portions in each of which the saliency index value exceeded the high saliency threshold value was large for the attention impairment patient, and the bottom-up attention was predominant for the attention impairment patient.

In addition, the healthy person was selected as the subject, and the subject state was divided into the drifted state and the normal state. Then, the task demand was changed to conduct the above-described experiment. More specifically, the drifted state of the subject was replicated by making the subject perform a different task (mental calculation) from the driving operation during the experiment using the driving simulator 80. The normal state of the subject was replicated by not making the subject perform the different task (the mental calculation) from the driving operation during the experiment using the driving simulator 80. In addition, a video of the monotonous driving scene such as on the controlled-access highway was played by the driving simulator 80 to replicate a situation with the small task demand. A video of the complicated driving scene such as on the public road in the urban area was played by the driving simulator 80 to replicate a situation with the large task demand. The driving scene on the public road in the urban area included events such as avoidance of a parked vehicle, passing of the intersection, making a right turn, making a left turn, following a preceding vehicle, and crossing by the pedestrian.

By the above-described experiment, the inventor of the present application determined the following regarding an "attention source total amount". The "attention source total amount" refers to a total amount of the top-down attention source amount and the bottom-up attention source amount.

(1) The attention source total amount of the attention impairment patient is smaller than the attention source total amount of the healthy person.

(2) The top-down attention source amount and the bottom-up attention source amount of the healthy person differ between the drifted state and the normal state of the healthy person. More specifically, in the drifted state, the top-down attention source amount of the healthy person falls below the top-down attention demand amount. In the normal state, the top-down attention source amount of the healthy person does not fall below the top-down attention demand amount. In addition, the top-down attention source amount of the healthy person in the drifted state is smaller than the top-down attention source amount of the healthy person in the normal state. The bottom-up attention source amount of the healthy person in the drifted state is larger than the bottom-up attention source amount of the healthy person in the normal state. The attention source total amount of the healthy person is equivalent to the attention source total amount of the healthy person in the normal state.

(3) The top-down attention source amount and the bottom-up attention source amount of the healthy person are changed according to the task demand. More specifically, in the case where the top-down attention demand amount is reduced due to the reduction in the task demand, the top-down attention source amount is reduced. Then, the bottom-up attention source amount is increased by the reduced amount of the top-down attention source amount. On the other hand, in the case where the top-down attention demand amount is increased due to the increase in the task demand, the top-down attention source amount is increased. Then, the bottom-up attention source amount is reduced by the increased amount of the top-down attention source amount.

[Relationship Among Driver State, Task Demand, and Attention Source]

Figure 14:
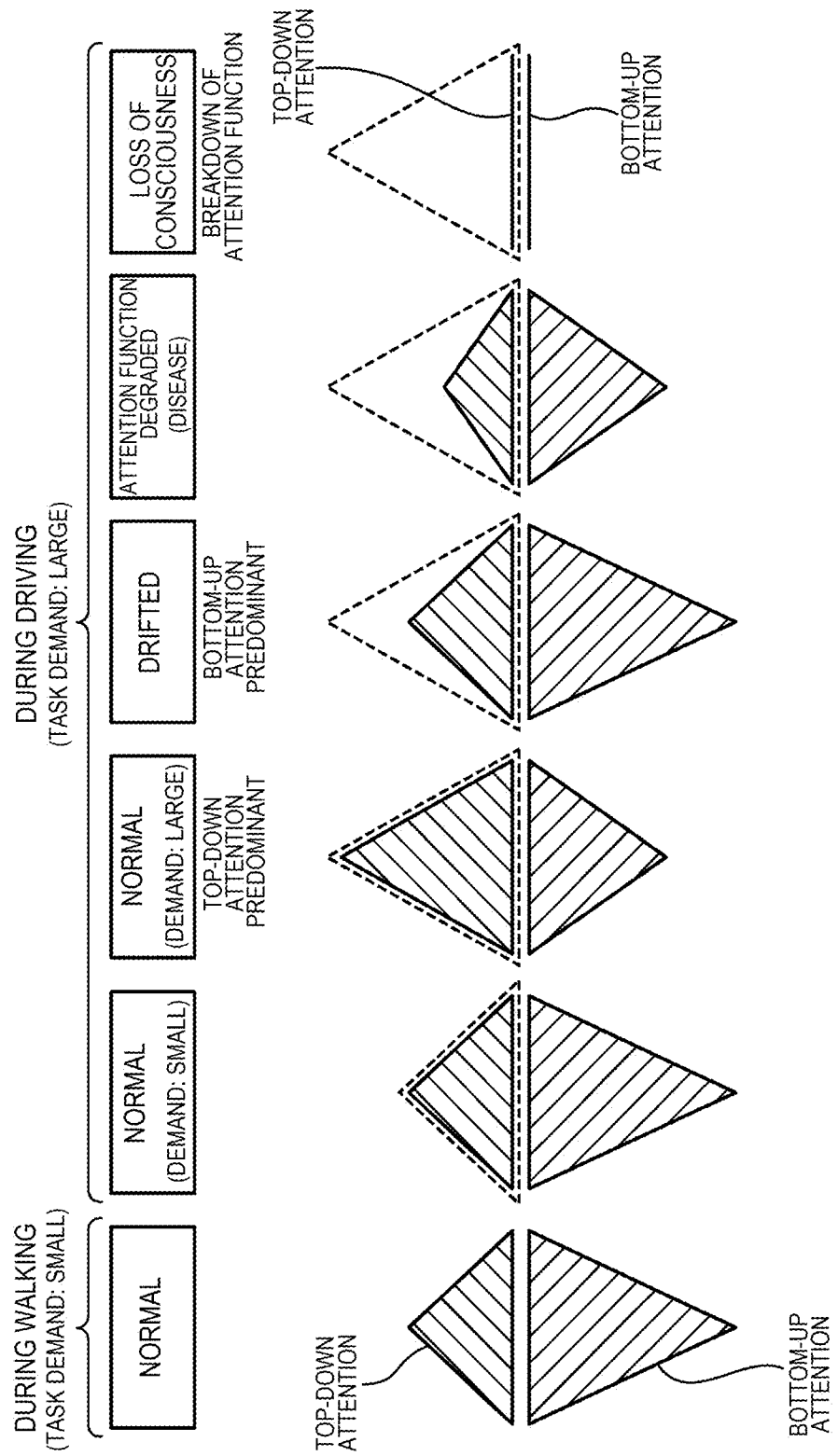
FIG. 14 is a view illustrating a change in an amount of the attention source that is allocated to each of top-down attention and bottom-up attention.

As described so far, as illustrated in FIG. 14, the inventor of the present application determined that the top-down attention source amount and the bottom-up attention source amount of the driver were changed according to the driver state and the task demand. In an example illustrated in FIG. 14, a height of each up-pointing triangle with diagonal hatch lines from bottom left to top right indicates the top-down attention source amount of the driver. A height of each of the broken up-pointing triangle indicates the top-down attention demand amount of the driver. A height of each down-pointing triangle with diagonal hatch lines from bottom right to top left indicates the bottom-up attention source amount of the driver. FIG. 14 also illustrates, as other reference examples, the top-down attention source amount and the bottom-up attention source amount of the pedestrian and the top-down attention source amount and the bottom-up attention source amount of the unconscious driver. In the example illustrated in FIG. 14, the top-down attention source amount and the bottom-up attention source amount of the unconscious driver are zero.

More specifically, the inventor of the present application determined the following.

(1) When the driver state is shifted from the normal state to the attention function degraded state, the attention source total amount of the driver is reduced. More specifically, the top-down attention source amount is reduced, and the top-down attention source amount falls below the top-down attention demand amount. In addition, the bottom-up attention source amount is also reduced.

(2) The top-down attention source amount and the bottom-up attention source amount of the driver are changed according to the driver state. More specifically, when the driver state is shifted from the normal state to the drifted state, the top-down attention source amount is reduced, and the top-down attention source amount falls below the top-down attention demand amount. Meanwhile, the bottom-up attention source amount is increased by the reduced amount of the top-down attention source amount. On the contrary, when the driver state is shifted from the drifted state to the normal state, the top-down attention source amount is increased, and the top-down attention source amount reaches the top-down attention demand amount. Meanwhile, the bottom-up attention source amount is reduced by the increased amount of the top-down attention source amount. The attention source total amount of the driver in the drifted state is equivalent to the attention source total amount of the driver in the normal state.

(3) The top-down attention source amount and the bottom-up attention source amount of the driver are changed according to the task demand. More specifically, when the task demand is increased, the top-down attention demand amount is increased. As a result, the top-down attention source amount is increased, and the top-down attention source amount reaches the top-down attention demand amount. Meanwhile, the bottom-up attention source amount is reduced by the increased amount of the top-down attention source amount. On the contrary, when the task demand is reduced, the top-down attention demand amount is reduced. As a result, the top-down attention source amount is reduced, and the top-down attention source amount reaches the top-down attention demand amount. Meanwhile, the bottom-up attention source amount is increased by the reduced amount of the top-down attention source amount.

Furthermore, the inventor of the present application determined the following.

(4) When the first index value id1, which is correlated with the top-down attention source amount of the driver, is compared with a predetermined first threshold value th1, the top-down attention source amount of the driver can be evaluated. The first threshold value th1 is set to a value that corresponds to the top-down attention demand amount of the driver. As the top-down attention demand amount is increased, the first threshold value th1 is increased. For example, the first threshold value th1 is set to the first index value id1 at the time when the top-down attention source amount matches the top-down attention demand amount. The top-down attention demand amount is changed according to the task demand. More specifically, when the task demand is increased, the top-down attention demand amount is increased.

(5) When the second index value id2, which is correlated with the bottom-up attention source amount of the driver, is compared with a predetermined second threshold value th2, the bottom-up attention source amount of the driver can be evaluated. The second threshold value th2 is set to a value that corresponds to the bottom-up attention demand amount of the driver. As the bottom-up attention demand amount of the driver is increased, the second threshold value th2 is increased. For example, the second threshold value th2 is set to the second index value id2 at the time when the bottom-up attention source amount matches the bottom-up attention demand amount. The bottom-up attention demand amount of the driver is changed according to the task demand. More specifically, when the task demand is increased, the bottom-up attention demand amount of the driver is reduced. For example, the bottom-up attention demand amount is an amount that is acquired by subtracting the top-down attention demand amount from a predetermined attention demand total amount. For example, the attention demand total amount is the attention source total amount in the normal state.

[Estimation of Driver State]

Next, a description will be made on the estimation of the driver state with reference to FIG. 15. The estimation section 340 performs the following processing at predetermined estimation intervals.

<Step ST11>

The estimation section 340 determines whether the first index value id1 falls below the first threshold value th1. If the first index value id1 falls below the first threshold value th1, processing in step ST11 is performed. If not, processing in step S15 is performed.

<Step ST12>

The estimation section 340 determines whether the second index value id2 falls below the second threshold value th2. If the second index value id2 falls below the second threshold value th2, processing in step ST13 is performed. If not, processing in step S14 is performed.

<Step ST13>

In the case where the first index value id1 falls below the first threshold value th1 and the second index value id2 falls below the second threshold value th2, the estimation section 340 estimates that the driver is in the attention function degraded state. In this example, the estimation section 340 turns on a flag indicative of the attention function degraded state. When the flag indicative of the attention function degraded state is turned on, the vehicle control section 35 performs the operation according to the attention function degraded state. Examples of the operation according to the attention function degraded state are operation to output abnormal information indicating that the driver state is the attention function degraded state (for example, the disease), operation to notify the outside of the vehicle that the driver state is the attention function degraded state, and operation to control the actuator 11 such that the vehicle travels on the safe route and is stopped in the safe area. An example of the operation to output the abnormal information is operation to notify the inside of the vehicle that the driver is in the attention function degraded state by outputting the abnormal information to the notification section 40. An example of the operation to notify the outside of the vehicle that the driver is in the attention function degraded state is operation to blink a hazard warning lamp of the vehicle.

<Step ST14>

Meanwhile, in the case where the first index value id1 falls below the first threshold value th1 and the second index value id2 does not fall below the second threshold value th2, the estimation section 340 does not estimate that the driver is in the attention function degraded state but estimates that the driver is in the drifted state. In this example, the estimation section 340 turns on a flag indicative of the drifted state. When the flag indicative of the drifted state is turned on, the vehicle control section 35 performs the operation according to the drifted state. Examples of the operation according to the drifted state are operation to output drifted state information indicating that the driver state is the drifted state and operation to relieve the drifted state of the driver. An example of the operation to output the drifted state information is operation to notify the inside of the vehicle that the driver is in the drifted state by outputting the drifted state information to the notification section 40. Examples of the operation to relieve the drifted state of the driver are operation to output information that urges the driver to focus on driving of the vehicle to the notification section 40 and operation to output information that urges the driver to take a rest to the notification section 40.

<Step ST15>

In the case where the first index value id1 does not fall below the first threshold value th1, the estimation section 340 estimates that the driver is in the normal state. In this example, the estimation section 340 turns on a flag indicative of the normal state. When the flag indicative of the normal state is turned on, the vehicle control section 35 performs the operation according to the normal state. Examples of the operation according to the normal state are operation to output information indicating that the driver state is the normal state and operation to continue the travel control.

[Effects of Embodiment]

As it has been described so far, when the first index value id1, which is correlated with the top-down attention source amount of the driver, and the second index value id2, which is correlated with the bottom-up attention source amount of the driver, are used, it is possible to estimate the driver state including the attention function degraded state of the driver on the basis of the top-down attention source amount of the driver and the bottom-up attention source amount of the driver.

For example, in the case where the first index value id1, which is correlated with the top-down attention source amount, falls below the first threshold value th1, the second index value id2, which is correlated with the bottom-up attention source amount, is compared with the second threshold value th2. In this way, it is possible to estimate whether the driver is in the attention function degraded state.

In addition, compared to a case where the driver state is estimated on the basis of only one of the top-down attention source amount and the bottom-up attention source amount, it is possible to improve estimation accuracy of the driver state.

Since the sightline detection section 310, the point of interest detection section 321, and the first index derivation section 322 are provided, it is possible to appropriately derive the first index value id1, which is correlated with the top-down attention source amount, based on the motion of the driver's sightline with respect to the point of interest in the driver's surrounding environment. In addition, since the sightline detection section 310, the saliency detection section 331, and the second index derivation section 332 are provided, it is possible to appropriately derive the second index value id2, which is correlated with the bottom-up attention source amount, based on the motion of the driver's sightline with respect to the distribution of the saliency in the driver's surrounding environment.

Since the first threshold value th1 is set to the value that corresponds to the top-down attention demand amount of the driver, the first threshold value th1 used for the evaluation of the top-down attention source amount of the driver may be appropriately set.

Since the second threshold value th2 is set to the value that corresponds to the bottom-up attention demand amount of the driver, the second threshold value th2 used for the evaluation of the bottom-up attention source amount of the driver may be appropriately set.

(Modified Example of Second Index Derivation Section)

The second index derivation section 332 may derive the second index value id2 for each predetermined measurement period as follows.

First, the second index derivation section 332 extracts two or more pieces of the saliency map data D4 included in the measurement period from the plural pieces of the saliency map data D4 that are arranged in the chronological order. Then, based on the direction of the driver's sightline detected by the sightline detection section 310, the second index derivation section 332 detects the focus point in each of two or more pieces of the saliency map data D4 included in the measurement period.

Next, the second index derivation section 332 determines whether the focus point, which is detected from the saliency map data D4 included in the measurement period, matches the high saliency point in the saliency map data D4.

Next, the second index derivation section 332 derives the second index value id2 based on a result of the matching determination between the focus point and the high saliency point. For example, the second index value id2 is a value that corresponds to a ratio of the number of the focus points matching the high saliency point to the total number of the focus points included in the measurement period (hereinafter described as a "high saliency matching ratio"). This high saliency matching ratio is an example of the matching degree between the high saliency point in the driver's surrounding environment and the driver's sightline.

First Modified Example of Embodiment

Next, a description will be made on a vehicle control system 10 according to a first modified example of the embodiment. The vehicle control system 10 according to the first modified example of the embodiment differs from the vehicle control system 10 according to the embodiment in terms of the operation of the estimation section 340. However, the other configuration of the vehicle control system 10 according to the first modified example of the embodiment is the same as the configuration of the vehicle control system 10 according to the embodiment.

As a result of the study, the inventor of the present application determined that there was a case where the reduction in the top-down attention source amount of the driver did not appear prominently when the driver was in the attention function degraded state (for example, the disease) and the driver tried hard to look at the point of interest. In addition, the inventor of the present application found that, even in such a case, the attention source total amount of the driver was reduced when the driver state was shifted from the normal state to the attention function degraded state.

[Estimation of Driver State]

Figure 15:
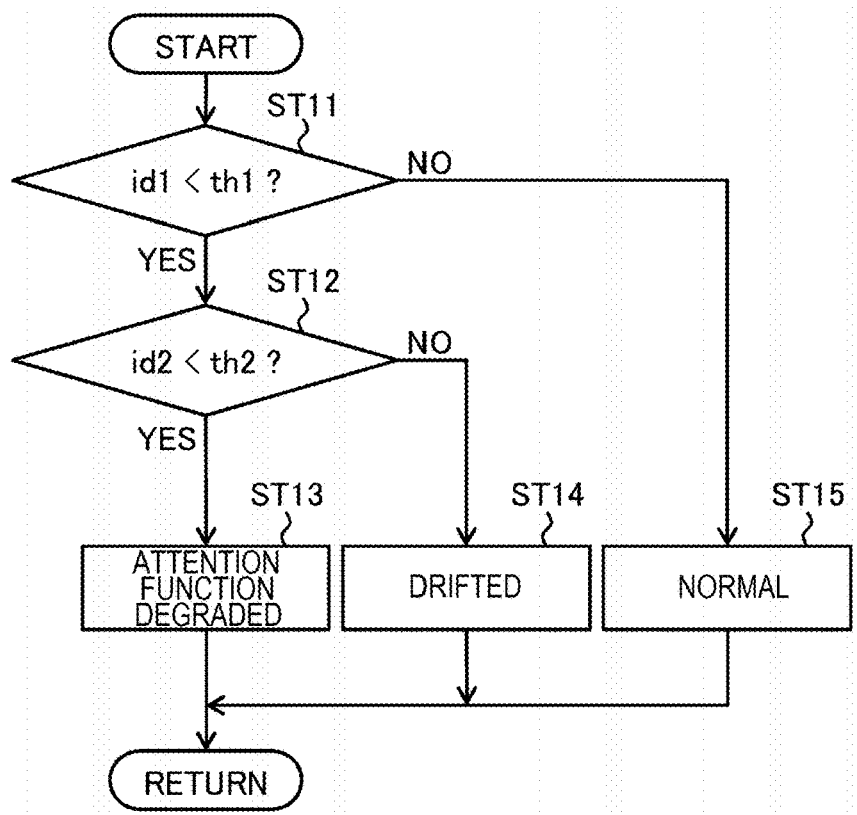
FIG. 15 is a flowchart illustrating estimation of a driver state.
Figure 16:
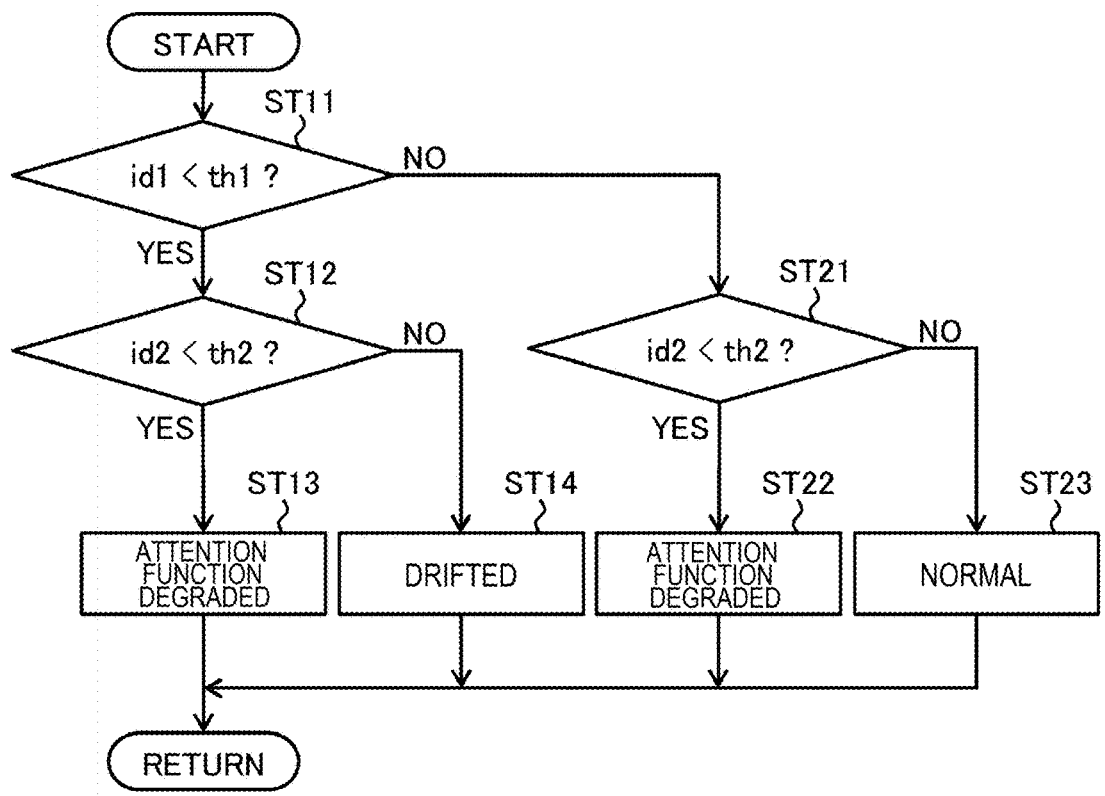
FIG. 16 is a flowchart illustrating a modified example of the estimation of the driver state.

In the vehicle control system 10 according to the first modified example of the embodiment, processing illustrated in FIG. 16 is performed instead of the processing illustrated in FIG. 15. In the processing illustrated in FIG. 16, processing in steps ST21 to ST23 is performed instead of the processing in step ST15 illustrated in FIG. 15.

<Step ST21>

In the case where the first index value id1 does not fall below the first threshold value th1 in step ST11, the estimation section 340 determines whether the second index value id2 falls below the second threshold value th2. If the second index value id2 falls below the second threshold value th2, processing in step ST22 is performed. If not, processing in step S23 is performed.

<Step ST22>

In the case where the first index value id1 does not fall below the first threshold value th1 and the second index value id2 falls below the second threshold value th2, the estimation section 340 estimates that the driver is in the attention function degraded state. In this example, the estimation section 340 turns on the flag indicative of the attention function degraded state.

<Step ST23>

Meanwhile, in the case where the first index value id1 does not fall below the first threshold value th1 and the second index value id2 does not fall below the second threshold value th2, the estimation section 340 estimates that the driver is in the normal state. In this example, the estimation section 340 turns on the flag indicative of the normal state.

[Effects of First Modified Example of Embodiment]

As has been described herein, in the case where the first index value id1 does not fall below the first threshold value th1, the driver state is estimated based on the comparison result between the second index value id2 and the second threshold value th2. In this way, even in the case where the driver is in the attention function degraded state (for example, the disease) but the reduction in the top-down attention source amount of the driver does not appear prominently, it is possible to estimate that the driver is in the attention function degraded state. In this way, it is possible to improve the estimation accuracy of the driver state.

Second Modified Example of Embodiment

Next, a description will be made on a vehicle control system 10 according to a second modified example of the embodiment. The vehicle control system 10 according to the second modified example of the embodiment differs from the vehicle control system 10 according to the embodiment in terms of the operation of the first index derivation section 322 and the second index derivation section 332. However, the other configuration of the vehicle control system 10 according to the second modified example of the embodiment is the same as the configuration of the vehicle control system 10 according to the embodiment.

[Driver's Sightline]

The driver's sightline that matches neither the point of interest in the driver's surrounding environment nor the high saliency point is included in the driver's sightline detected by the sightline detection section 310. There is a high possibility that such driver's sightline acts as noise when the first index value id1 and the second index value id2 are derived. Accordingly, the driver's sightline that matches neither the point of interest in the driver's surrounding environment nor the high saliency point may not be used to derive the first index value id1 and the second index value id2.

In the vehicle control system 10 according to the second modified example of the embodiment, the first index derivation section 322 and the second index derivation section 332 are configured not to use the driver's sightline that matches neither the point of interest in the driver's surrounding environment nor the high saliency point among the driver's sightline detected by the sightline detection section 310 for a purpose of deriving the first index value id1 and the second index value id2. For example, the first index derivation section 322 and the second index derivation section 332 may be configured to perform processing as follows.

Each of the first index derivation section 322 and the second index derivation section 332 detects the focus point that matches neither the point of interest nor the high saliency point from the focus points included in the measurement period on the basis of the result of the matching determination between the point of interest and the focus point by the first index derivation section 322 and the result of the matching determination between the high saliency point and the focus point by the second index derivation section 332. Then, each of the first index derivation section 322 and the second index derivation section 332 subtracts the number of the focus points, each of which matches neither the point of interest nor the high saliency point, from the total number of the focus points included in the measurement period, and sets the number acquired from the subtraction as a parameter of the focus points included in the measurement period. However, the above processing may be performed by one of the first index derivation section 322 and the second index derivation section 332, and a processing result thereof may be used by the other of the first index derivation section 322 and the second index derivation section 332.

Next, the first index derivation section 322 derives, as the first index value id1, a value that corresponds to a ratio of the number of the focus points matching the points of interest to the parameter of the focus points included in the measurement period.

Meanwhile, the second index derivation section 332 derives, as the second index value id2, a value that corresponds to a ratio of the number of the focus points matching the high saliency point to the parameter of the focus points included in the measurement period.

[Effects of Second Modified Example of Embodiment]

As it has been described so far, it is possible to eliminate the driver's sightline, which matches neither the point of interest in the driver's surrounding environment nor the high saliency point, (that is, the driver's sightline as the noise) from the driver's sightline, which is detected by the sightline detection section 310, when the first index value id1 and the second index value id2 are derived. In this way, it is possible to improve the estimation accuracy of the driver state.

Third Modified Example of Embodiment

Next, a description will be made on a vehicle control system 10 according to a third modified example of the embodiment. The vehicle control system 10 according to the third modified example of the embodiment differs from the vehicle control system 10 according to the embodiment in terms of the configuration of the driver state estimation section 300. However, the other configuration of the vehicle control system 10 according to the third modified example of the embodiment is the same as the configuration of the vehicle control system 10 according to the embodiment.

Figure 17:
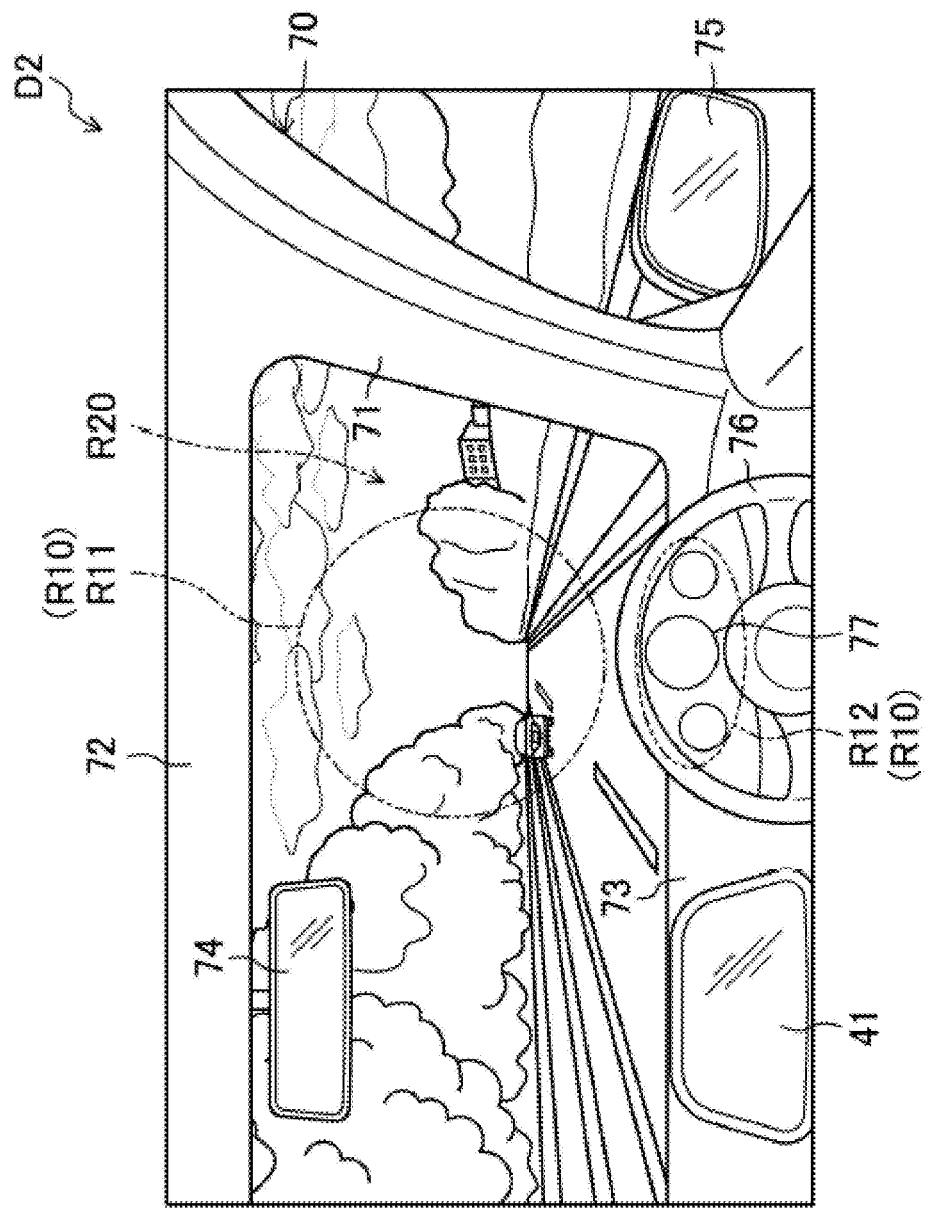
FIG. 17 is a view illustrating a first area where top-down attention is predominant and a second area where bottom-up attention is predominant.

As a result of the study, as illustrated in FIG. 17, the inventor of the present application found that the driver's surrounding environment included: a first area R10 where the top-down attention of the driver was predominant; and a second area R20 where the bottom-up attention of the driver was predominant. For example, when the driver state is shifted from the normal state to the attention function degraded state, the top-down attention source amount is prominently reduced in the first area R10, and the bottom-up attention source amount is prominently reduced in the second area R20.

<First Area>

In the driver's surrounding environment, the first area R10 is an area where a frequency that the driver consciously focuses during driving of the vehicle is high. Examples of the first area R10 are a front center area R11, a meter cluster area R12 including the meter cluster 77, and an area including a head-up display. The front center area R11 is a circular area that is located at a center in front of the driver who is in the vehicle.

Size of the first area R10 is changed according to the moving speed of the vehicle. More specifically, the first area R10 is reduced as the moving speed of the vehicle is increased. For example, as the moving speed of the vehicle is increased, a radius of the front center area R11 is reduced.

<Second Area>

In the driver's surrounding environment, the second area R20 is an area where the frequency that the driver consciously focuses during driving of the vehicle is low. Examples of the second area R20 are an area including the rear-view mirror 74, an area including the side mirror 75, an area including scenery around the vehicle such as the sky and a cloud, and an area including a lighting section such as an indicating lamp lit by a Rear Vehicle Monitoring system (RVM). For example, the second area R20 may be an area in the driver's surrounding environment other than the first area R10.

[Driver State Estimation Section]

In the driver state estimation section 300 according to the third modified example of the embodiment, the first measurement section 320 measures the first index value id1 in the first area R10. The second measurement section 330 measures the second index value id2 in the first area R10. The estimation section 340 estimates the driver state based on the first index value id1 in the first area R10 and the second index value id2 in the second area R20. For example, the first measurement section 320, the second measurement section 330, and the estimation section 340 may be configured as follows.

<First Measurement Section>

The first index derivation section 322 in the first measurement section 320 derives the first index value id1 in the first area R10 based on movement of the driver's sightline with respect to the point of interest in the driver's surrounding environment. More specifically, in the third modified example of the embodiment, the first index derivation section 322 performs similar operation to the operation of the first index derivation section 322 in the embodiment with respect to the first area R10 in the point of interest map data D3 generated by the point of interest detection section 321.

In addition, the first index derivation section 322 in the first measurement section 320 sets, as the first area R10, the area where the frequency that the driver focuses during driving of the vehicle is high in the driver's surrounding environment. For example, the first index derivation section 322 detects distribution of the focus points in the point of interest map data D3 in a predetermined monitoring period based on the driver's sightline, which is detected by the sightline detection section 310. Then, the first index derivation section 322 sets, as the first area R10, an area including a point at which density of the focus points is greater than a predetermined first density threshold value in the point of interest map data D3. The first area R10 may be updated periodically.

Furthermore, the first index derivation section 322 in the first measurement section 320 changes the size of the first area R10 according to the moving speed of the vehicle. More specifically, the first index derivation section 322 changes the size of the first area R10 such that the first area R10 is reduced as the moving speed of the vehicle is increased.

<Second Measurement Section>

The second index derivation section 332 in the second measurement section 330 derives the second index value id2 in the second area R20 based on the motion of the driver's sightline with respect to the distribution of the saliency in the driver's surrounding environment. More specifically, in the third modified example of the embodiment, the second index derivation section 332 performs similar operation to the operation of the second index derivation section 332 in the embodiment with respect to the second area R20 in the saliency map data D4, which is generated by the saliency detection section 331.

In addition, the second index derivation section 332 in the second measurement section 330 sets, as the second area R20, the area where the frequency that the driver focuses during driving of the vehicle is low in the driver's surrounding environment. For example, the second index derivation section 332 detects the distribution of the focus points in the saliency map data D4 in the predetermined monitoring period based on the driver's sightline, which is detected by the sightline detection section 310. Then, the second index derivation section 332 sets, as the second area R20, an area including a point at which the density of the focus points is less than a predetermined second density threshold value in the saliency map data D4. Here, the second density threshold value may be density that is less than the first density threshold value or may be the same density as the first density threshold value. The second area R20 may be updated periodically.

The second index derivation section 332 may set, as the second area R20, an area in the saliency map data D4 other than the first area R10 set by the first index derivation section 322.

<Estimation Section>

In the third modified example of the embodiment, the estimation section 340 performs the following processing in the processing illustrated in FIG. 15. In step ST11 of FIG. 15, the estimation section 340 determines whether the first index value id1 in the first area R10 falls below the first threshold value th1. In step ST12 of FIG. 15, the estimation section 340 determines whether the second index value id2 in the second area R20 falls below the second threshold value th2.

In the case where the first index value id1 in the first area R10 falls below the first threshold value th1 and the second index value id2 in the second area R20 falls below the second threshold value th2, the estimation section 340 estimates that the driver is in the attention function degraded state (step ST13). In the case where the first index value id1 in the first area R10 falls below the first threshold value th1 and the second index value id2 in the second area R20 does not fall below the second threshold value th2, the estimation section 340 estimates that the driver is in the drifted state (step ST14). In the case where the first index value id1 in the first area R10 does not fall below the first threshold value th1, the estimation section 340 estimates that the driver is in the normal state (step ST15).

In the third modified example of the embodiment, the estimation section 340 may be configured to perform the following processing in the processing illustrated in FIG. 16. In step ST11 of FIG. 16, the estimation section 340 determines whether the first index value id1 in the first area R10 falls below the first threshold value th1. In steps ST12, ST21 of FIG. 16, the estimation section 340 determines whether the second index value id2 in the second area R20 falls below the second threshold value th2.

In the case where the first index value id1 in the first area R10 does not fall below the first threshold value th1 and the second index value id2 in the second area R20 falls below the second threshold value th2, the estimation section 340 estimates that the driver is in the attention function degraded state (step ST22). In the case where the first index value id1 in the first area R10 does not fall below the first threshold value th1 and the second index value id2 in the second area R20 does not fall below the second threshold value th2, the estimation section 340 estimates that the driver is in the normal state (step ST23).

[Effects of Third Modified Example of Embodiment]

As it has been described so far, when the first index value id1 in the first area R10 and the second index value id2 in the second area R20 are used, it is possible to estimate the driver state including the attention function degraded state of the driver on the basis of the top-down attention source amount of the driver in the first area R10 where the top-down attention of the driver is predominant and the bottom-up attention source amount of the driver in the second area R20 where the bottom-up attention of the driver is predominant.

In addition, the driver state is estimated by using the first index value id1 in the first area R10 and the second index value id2 in the second area R20. Accordingly, compared to a case where the first index value id1 and the second index value id2 in the entire driver's surrounding environment, it is possible to reduce a processing load that is required to derive the first index value id1 and the second index value id2 (for example, a processing load that is required to detect the focus point).

Furthermore, in the driver's surrounding environment, the area where the frequency that the driver focuses during driving of the vehicle is high is set as the first area R10. Thus, it is possible to appropriately set the first area R10 where the top-down attention of the driver is predominant.

Other Embodiments

In the description that has been made so far, the case where the first index value id1 is the value that corresponds to the interest matching ratio (the ratio of the number of the focus points matching the points of interest to the total number of the focus points included in the measurement period) has been described. However, the technique disclosed herein is not limited thereto. Similarly, the case where the second index value id2 is the value that corresponds to the high index ratio (the ratio of the number of the saliency index values exceeding the high saliency threshold value to the total number of the saliency index values included in the measurement period) or the high saliency matching ratio (the ratio of the number of the focus points matching the high saliency points with respect to the total number of the focus points included in the measurement period) has been described. However, the technique disclosed herein is not limited thereto.

In the description herein, the vehicle is the example of the movable body. However, the movable body is not limited thereto. For example, other examples of the movable body are a watercraft and an airplane.

In the description herein, the case where each of the point of interest detection section 321 and the saliency detection section 331 acquires the front image data D1 based on the output of the camera 21 has been described. However, the technique disclosed herein is not limited thereto. For example, each of the point of interest detection section 321 and the saliency detection section 331 may be configured to acquire the front image data D1 based on the output of the external environment recognition section 33. In addition, the case where the front image data D1 and the composite image data D2 are generated in both of the point of interest detection section 321 and the saliency detection section 331 has been described. However, the front image data D1 and the composite image data D2 that are generated by one of the point of interest detection section 321 and the saliency detection section 331 may be used in the other of the point of interest detection section 321 and the saliency detection section 331.

In the description herein, the case where the estimation section 340 estimates the driver state at the estimation intervals has been described. However, the technique disclosed herein is not limited thereto. For example, the estimation section 340 may be configured to estimate a short-term state of the driver as described above or may be configured to estimate a long-term state of the driver. The short-term state of the driver is the driver state in a period (a period during driving once) from initiation of driving of the vehicle to termination thereof. The long-term state of the driver is the driver state in a period (for example, per year) in which the vehicle can be driven for plural times. Examples of the long-term state of the driver are a state of the disease where a symptom gradually progresses and a state of a degraded function due to aging.

In the description herein, the case where the estimation section 340 estimates the attention function degraded state, the drifted state, and the normal state has been described. However, the technique disclosed herein is not limited thereto. For example, the estimation section 340 may be configured to estimate a negative state of the driver such as the attention function degraded state or the drifted state described above or may be configured to estimate a positive state of the driver. Examples of the positive state of the driver are: a state where the driver is recovered from an unsuited state for driving of the vehicle such as the attention function degraded state or the drifted state to the normal state; and a state where the normal state is maintained.

In the description herein, the case where the vehicle controller 30 uses the image data acquired by the cameras 21 and the image data acquired by the in-vehicle camera 28 has been described. However, the technique disclosed herein is not limited thereto. For example, the vehicle controller 30 may be configured to use the image data that is input to display equipment and the image data that is acquired by a camera capturing an image of a target person (a target person who can be the driver) who sees the image on the display equipment. Examples of the display equipment are a smartphone, a personal computer, and a television receiver. Alternatively, the vehicle controller 30 may be configured to use image data that is acquired by a monitoring camera and image data that is acquired by a camera capturing an image of a target person who sees the environment captured by the monitoring camera. The monitoring camera is provided to a waiting room of a hospital, a monitoring room for a security guard, a cash register at a store, inside of the building, a street, or the like.

In the description herein, the reference values such as the first threshold value th1 and the second threshold value th2 that serve as determination criteria may be set per driver. More specifically, the above reference values may be set or adjusted based on a learning result of information unique to the driver such as experience of the driver and regular behavior of the driver. An example of the experience of the driver is a traveling frequency on the road. For example, the above reference values may be set or adjusted based on whether the road on which the vehicle travels is the road on which the vehicle is used to travel or the road on which the vehicle travels for the first time. Examples of the regular behavior of the driver are average behavior of the driver in a long period such as one week or one month and behavior of the driver in a period in which the driver is estimated to be in the normal state by another method. An example of the behavior of the driver is a sensitivity of a moving speed of the driver's sightline with respect to the high saliency point and/or the point of interest.

In the description herein, the above reference values may be set based on a database that stores various types of data on persons. In such a database, age, physical characteristics, a physical function, personality, culture, lifestyle, driving experience, a driving skill, a driving style, and the like of each of the persons are stored in a mutually correlated manner. For example, a data group related to persons having a specific characteristic may be extracted from the data group stored in the database, and the above reference values may be set based on the extracted data group. Examples of the data group that is extracted from the data group stored in the database are a data group related to healthy persons, a data group related to persons having a specific disease, and a data group related to persons who have caused traffic accidents.

In the description herein, the above reference values may be set based on information that is acquired by different equipment (for example, the smartphone) from the vehicle controller 30.

The following description relates to a computer environment in which embodiments of the present disclosure may be implemented. This environment may include an embedded computer environment, local multi-processor embodiment, remote (e.g., cloud-based) environment, or a mixture of all the environments.

Figure 18:
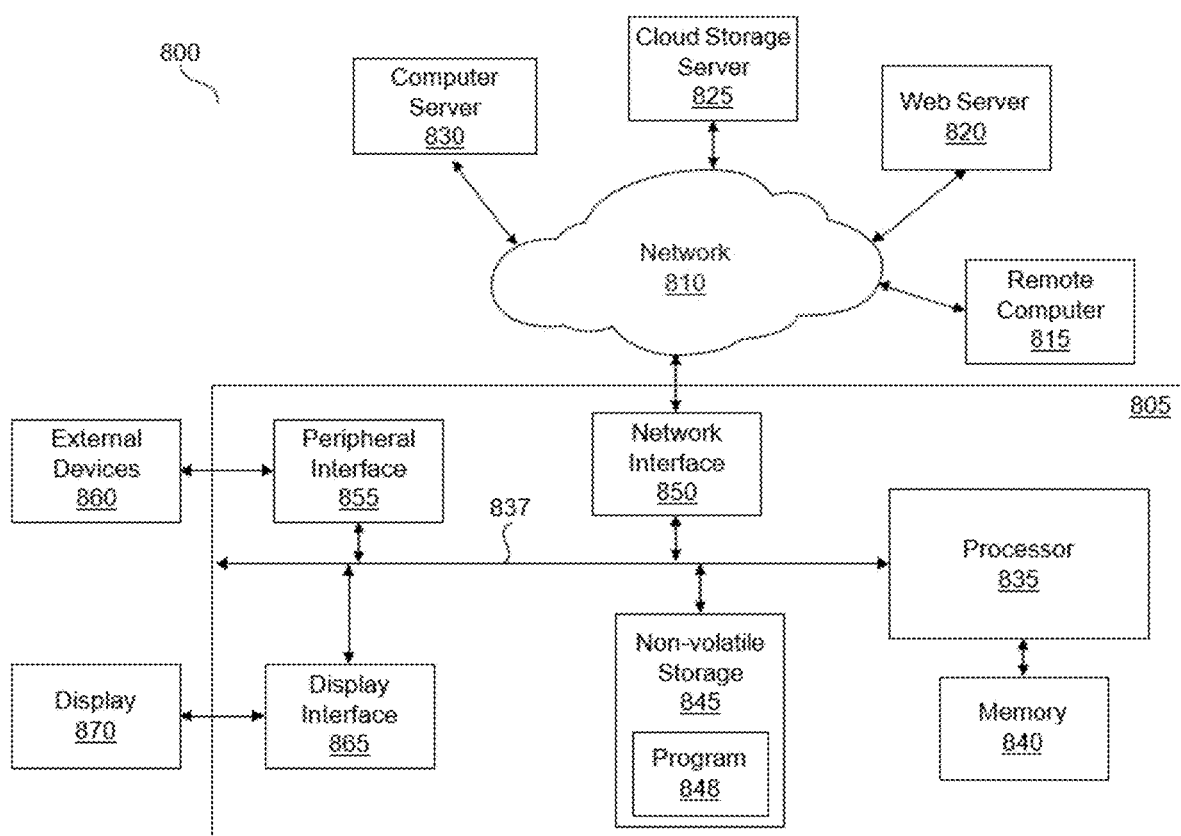
FIG. 18 is a block diagram of computer-based circuitry that may be used to implement control features of the present disclosure.

FIG. 18 illustrates a block diagram of a computer that may implement the various embodiments described herein. The present disclosure may be embodied as a system, a method, and/or a computer program product. The computer program product may include a computer readable storage medium on which computer readable program instructions are recorded that may cause one or more processors to carry out aspects of the embodiment.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random-access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C#, or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus, or other device to produce a computer implemented process, such that the instructions which execute on the computer, other programmable apparatus, or other device implement the functions specified in the flow diagrams and block diagrams in the present disclosure.

FIG. 18 is a functional block diagram illustrating a networked system 800 of one or more networked computers and servers. In an embodiment, the hardware and software environment illustrated in FIG. 18 may provide an exemplary platform for implementation of the software and/or methods according to the present disclosure.

Referring to FIG. 18, a networked system 800 may include, but is not limited to, computer 805, network 810, remote computer 815, web server 820, cloud storage server 825 and computer server 830. In some embodiments, multiple instances of one or more of the functional blocks illustrated in FIG. 3 may be employed.

Additional detail of computer 805 is shown in FIG. 18. The functional blocks illustrated within computer 805 are provided only to establish exemplary functionality and are not intended to be exhaustive. And while details are not provided for remote computer 815, web server 820, cloud storage server 825 and compute server 830, these other computers and devices may include similar functionality to that shown for computer 805.

Computer 805 may be built into the automobile, a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random-Access Memory (DRAM) and Static Random-Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine-readable instructions and/or data that is stored in non-volatile storage 845 and is used to create, manage, and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include input devices, e.g., any or all devices in the information acquisition means 10 and/or other suitable input devices, and output devices, e.g., any the various actuator devices AC and/or other suitable output devices, e.g., a speaker. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870, e.g., a head-up display or a screen of a car navigation system. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

The embodiments that have been described herein may appropriately be combined and implemented. The embodiment that has been described herein is essentially and merely illustrative and thus has no intention to limit the scopes of the present invention, application subjects thereof, and application thereof.

As it has been described herein, the technique disclosed herein is useful as the driver state estimation device.

DESCRIPTION OF REFERENCE SIGNS AND NUMERALS

10 Vehicle control system (movable body control system)
11 Actuator
20 Information acquisition section
21 Camera
22 Radar
23 Position sensor
24 Communication section
25 Vehicle state sensor
26 Driving operation sensor
27 Driver state sensor
28 In-vehicle camera
29 Biological information sensor
30 Vehicle controller (driver state estimation device)
31 Vehicle behavior recognition section
32 Driving operation recognition section
33 External environment recognition section
34 Driver state recognition section
35 Vehicle control section
300 Driver state estimation section
310 Sightline detection section
320 First measurement section
321 Point of interest detection section
322 First index derivation section
330 Second measurement section
331 Saliency detection section
332 Second index derivation section
340 Estimation section
800: Networked system
805: Computer
810: Network
815: Remote computer
820: Web Server
825: Cloud storage server
830: Computer server
835: Processor
837: Bus
840: Memory
845: Non-volatile storage
848: Program
850: Network interface (wireless)
855: Peripheral Interface
860: External devices
865: Display interface
870: Display
R10 First area
R11 Front center area
R12 Meter cluster area
R20 Second area

The invention claimed is:

1. A driver state estimation device that estimates a state of a driver who is in a movable body, the driver state estimation device comprising:

first circuitry configured to determine a first index value correlated with an amount of an attention source allocated to top-down attention of the driver;

second circuitry configured to determine a second index value correlated with an amount of the attention source allocated to bottom-up attention of the driver;

estimation circuitry configured to estimate the driver state including an attention function degraded state of the driver based on the first index value and the second index value; and a sightline detector that detects a driver's sightline, wherein the first circuitry is configured to:
  detect a point of interest in the driver's surrounding environment, and
  derive the first index value based on movement of the driver's sightline with respect to the point of interest in the driver's surrounding environment, and the second circuitry is configured to:
  detect distribution of saliency in the driver's surrounding environment; and
  derive the second index value based on movement of the driver's sightline with respect to the distribution of the saliency in the driver's surrounding environment, wherein under a condition that the first index value falls below a predetermined first threshold value, the estimation circuitry is configured to estimate that the driver is in the attention function degraded state under a condition that the second index value falls below a predetermined second threshold value, and the estimation circuitry is configured to estimate that the driver is not in the attention function degraded state under a condition that the second index value does not fall below the second threshold value, the first threshold value is set to a value that corresponds to the amount of the attention source requested to the top-down attention of the driver, the second threshold value is set to a value that corresponds to the amount of the attention source requested to the bottom-up attention of the driver, the first circuitry is configured to derive the first index value based on a matching degree between the point of interest in the driver's surrounding environment and the driver's sightline, the second circuitry is configured to derive the second index value based on a matching degree between a high saliency point in the driver's surrounding environment and the driver's sightline, and the first circuitry and the second circuitry do not use the driver's sightline that matches neither the point of interest in the driver's surrounding environment nor the high saliency point among the driver's sightline detected by the sightline detector to derive the first index value and the second index value.

2. The driver state estimation device according to claim 1, wherein the drives surrounding environment includes: a first area where the top-down attention of the driver is predominant; and a second area where the bottom-up attention of the driver is predominant, the first circuitry is configured to determine the first index value in the first area, the second circuitry is configured to determine the second index value in the second area, and the estimation circuitry is configured to estimate the driver state based on the first index value in the first area and the second index value in the second area.

3. The driver state estimation device according to claim 1, wherein
the driver's surrounding environment includes: a first area where the top-down attention of the driver is predominant; and a second area where the bottom-up attention of the driver is predominant,
the first circuitry is configured to determine the first index value in the first area,
the second circuitry is configured to determine the second index value in the second area, and
the estimation circuitry is configured to estimate the driver state based on the first index value in the first area and the second index value in the second area.

4. The driver state estimation device according to claim 1, wherein
under a condition that the first index value falls below a predetermined first threshold value, the estimation circuitry is configured to estimate that the driver is in the attention function degraded state under a condition that the second index value falls below a predetermined second threshold value, and the estimation circuitry is configured to estimate that the driver is not in the attention function degraded state under a condition that the second index value does not fall below the second threshold value.

5. The driver state estimation device according to claim 4, wherein
the first threshold value is set to value that corresponds to the amount of the attention source requested to the top-down attention of the driver, and
the second threshold value is set to a value that corresponds to the amount of the attention source requested to the bottom-up attention of the driver.

6. The driver state estimation device according to claim 5, wherein
the first circuitry is configured to derive the first index value based on a matching degree between the point of interest in the driver's surrounding environment and the driver's sightline,
the second circuitry is configured to derive the second index value based on a matching degree between a high saliency point in the driver's surrounding environment and the driver's sightline, and
the first circuitry and the second circuitry do not use the driver's sightline that matches neither the point of interest in the driver's surrounding environment nor the high saliency point among the driver's sightline detected by the sightline detector to derive the first index value and the second index value.

7. The driver state estimation device according to claim 6, wherein
the driver's surrounding environment includes: a first area where the top-down attention of the driver is predominant; and a second area where the bottom-up attention of the driver is predominant,
the first circuitry is configured to determine the first index value in the first area,
the second circuitry is configured to determine the second index value in the second area, and
the estimation circuitry is configured to estimate the driver state based on the first index value in the first area and the second index value in the second area.

8. The driver state estimation device according to claim 5, wherein the driver's surrounding environment includes: a first area where the top-down attention of the driver is predominant; and a second area where the bottom-up attention of the driver is predominant,
the first circuitry is configured to determine the first index value in the first area,
the second circuitry is configured to determine the second index value in the second area, and
the estimation circuitry is configured to estimate the driver state based on the first index value in the first area and the second index value in the second area.

9. The driver state estimation device according to claim 4, wherein
the drives surrounding environment includes: a first area where the top-down attention of the driver is predominant; and a second area where the bottom-up attention of the driver is predominant,
the first circuitry is configured to determine the first index value in the first area,
the second circuitry is configured to determine the second index value in the second area, and
the estimation circuitry is configured to estimate the driver state based on the first index value in the first area and the second index value in the second area.

10. The driver state estimation device according to claim 4, wherein:
the top-down attention is an attention mechanism in which the driver actively moves his/her sightline to an intended point, and
the bottom-up attention is an attention mechanism in which the driver's sightline is passively attracted to noticeable point.

11. A vehicle controller including the driver state estimation device according to claim 1, and control circuitry configured to control movement of the movable body.

12. A driver state estimation device that estimates a state of a driver who is in a movable body, the driver state estimation device comprising:
first circuitry configured to determine a first index value correlated with an amount of an attention source allocated to top-down attention of the driver;
second circuitry configured to determine a second index value correlated with an amount of the attention source allocated to bottom-up attention of the driver;
estimation circuitry configured to estimate the driver state including an attention function degraded state of the driver based on the first index value and the second index value; and
a sightline detector that detects a driver's sightline, wherein
the first circuitry is configured to:
detect a point of interest n the driver's surrounding environment, and
derive the first index value based on movement of the driver's sightline with respect to the point of interest in the driver's surrounding environment, and
the second circuitry is configured to:
detect distribution of saliency in the driver's surrounding environment; and
derive the second index value based on movement of the driver's sightline with respect to the distribution of the saliency in the driver's surrounding environment, wherein
the first circuitry is configured to derive the first index value based on a matching degree between the point of interest in the driver's surrounding environment and the driver's sightline, the second circuitry is configured to derive the second index value based on a matching degree between a high saliency point in the driver's surrounding environment and the driver's sightline, and the first circuitry and the second circuitry do not use the driver's sightline that matches neither the point of interest in the driver's surrounding environment nor the high saliency point among the driver's sightline detected by the sightline detector to derive the first index value and the second index value.

13. The driver state estimation device according to claim 12, wherein the driver's surrounding environment includes: a first area where the top-down attention of the driver is predominant; and a second area where the bottom-up attention of the driver is predominant, the first circuitry is configured to determine the first index value in the first area, the second circuitry is configured to determine the second index value in the second area, and the estimation circuitry is configured to estimate the driver state based on the first index value in the first area and the second index value in the second area.

14. A driver state estimation method that estimates a state of a driver who is in a movable body, the driver state estimation method comprising:

determining a first index value correlated with an amount of an attention source allocated to top-down attention of the driver;

determining a second index value correlated with an amount of the attention source allocated to bottom-up attention of the driver;

estimating the driver state including an attention function degraded state of the river based on the first index value and the second index value;

detecting a drivers sightline;

detecting a point of interest in the driver's surrounding environment, and deriving the first index value based on movement of the driver's sightline with respect to the point of interest in the driver's surrounding environment, and detecting distribution of saliency in the driver's surrounding environment;

deriving the second index value based on movement of the driver's sightline with respect to the distribution of the saliency in the driver's surrounding environment;

under a condition that the first index value falls below a predetermined first threshold value, estimating that the driver is in the attention function degraded state under a condition that the second index value falls below a predetermined second threshold value and estimating that the driver is not in the attention function degraded state under a condition that the second index value does not fall below the second threshold value;

setting the first threshold value to a value that corresponds to the amount of the attention source requested to the top-down attention of the driver;

setting the second threshold value to a value that corresponds to the amount of the attention source requested to the bottom-up attention of the driver;

deriving the first index value based on a matching degree between the point of interest in the driver's surrounding environment and the driver's sightline;

deriving the second index value based on a matching degree between a high saliency point in the driver's surrounding environment and the driver's sightline; and not using the driver's sightline that matches neither the point of interest in the driver's surrounding environment nor the high saliency point among the driver's sightline detected to derive the first index value oared the second index value.

15. A non-transitory computer readable storage device having computer readable instructions that when executed by a controller including a computer cause the computer to execute a driver state estimation method, the driver state estimation method comprising:

determining a first index value correlated with an amount of an attention source allocated to top-down attention of the driver;

determining a second index value correlated with an amount of the attention source allocated to bottom-up attention of the driver;

estimating the driver state including an attention function degraded state of the driver based on the first index value and the second index value;

detecting a driver's sightline;

detecting a point of interest in the driver's surrounding environment, and deriving the first index value based on movement of the driver's sightline with respect to the point of interest in the driver's surrounding environment, and detecting distribution of saliency in the driver's surrounding environment;

deriving the second index value based on movement of the driver's sightline with respect to the distribution of the saliency in the driver's surrounding environment;

under a condition that the first index value falls below a predetermined first threshold value, estimating that the driver is in the attention function degraded state under a condition that the second index value falls below a predetermined second threshold value and estimating that the driver is not in the attention function degraded state under a condition that the second index value does not fall below the second threshold value;

setting the first threshold value to a value that corresponds to the amount of the attention source requested to the top-down attention of the driver;

setting the second threshold value to a value that corresponds to the amount of the attention source requested to the bottom-up attention of the driver;

deriving the first index value based on a matching degree between the point of interest in the driver's surrounding environment and the driver's sightline;

deriving the second index value based on a matching degree between a high saliency point in the driver's surrounding environment and the driver's sightline; and not using the driver's sightline that matches neither the point of interest in the driver's surrounding environment nor the high saliency point among the driver's sightline detected by a sightline detector to derive the first index value and the second index value.

* * * * *